(12) United States Patent
Ying et al.

(10) Patent No.: US 8,173,010 B2
(45) Date of Patent: May 8, 2012

(54) METHOD OF DRY REFORMING A REACTANT GAS WITH INTERMETALLIC CATALYST

(75) Inventors: Jackie Y. Ying, Singapore (SG); Steven E. Weiss, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1113 days.

(21) Appl. No.: 11/438,079

(22) Filed: May 19, 2006

(65) Prior Publication Data
US 2006/0280998 A1 Dec. 14, 2006

Related U.S. Application Data

(60) Provisional application No. 60/682,737, filed on May 19, 2005.

(51) Int. Cl.
*C10G 57/00* (2006.01)
*C23C 16/00* (2006.01)
*H01M 8/06* (2006.01)
*B01J 21/00* (2006.01)

(52) U.S. Cl. .......... 208/51; 429/421; 429/425; 427/250; 208/53; 208/120.01; 208/120.1; 208/120.2; 502/107; 502/242

(58) Field of Classification Search .................. None
See application file for complete search history.

(56) References Cited

U.S. PATENT DOCUMENTS

| | | |
|---|---|---|
| 1,847,095 A | 3/1932 | Mittasch et al. |
| 2,168,840 A | 8/1939 | Groll |
| 2,263,366 A | 11/1941 | Peck et al. |
| 3,119,667 A | 1/1964 | McMahan |
| 3,163,563 A | 12/1964 | Douglass et al. |
| 3,531,394 A | 9/1970 | Koszman et al. |
| 3,864,284 A | 2/1975 | Clippinger et al. |
| 4,162,345 A | 7/1979 | Holzl |
| 4,189,405 A | 2/1980 | Knapton et al. |
| 4,202,934 A * | 5/1980 | Jalan .......................... 429/498 |
| 4,297,150 A | 10/1981 | Foster et al. |

(Continued)

FOREIGN PATENT DOCUMENTS
GB 944211 12/1963
(Continued)

OTHER PUBLICATIONS

Lewis, Richard J., Sr. (2002). Hawley's Condensed Chemical Dictionary (14th Edition).. John Wiley & Sons. ISBN: 978-0-471-38735-0 Electronic ISBN: 978-1-59124-483-7.*

(Continued)

*Primary Examiner* — Keith Walker
(74) *Attorney, Agent, or Firm* — Theresa A. Lober

(57) ABSTRACT

The invention relates to materials used as electrodes and/or catalysts, as well as methods associated with the same. The materials may comprise an alloy or intermetallic compound of a transition metal (e.g., Ni) and a metal additive (e.g., Sn). The transition metal and additive are selected to provide improved electrode and/or catalytic performance. For example, the materials of the invention may have a high catalytic activity, while being less susceptible to coking than certain conventional electrode/catalytic materials. These performance advantages can simplify the equipment used in certain applications, as well as reducing energy and capital requirements. Furthermore, the materials may be manufactured using traditional ceramic processing methods, without the need for complex, unconventional fabrication techniques. The materials are particularly suitable for use in fuel cells (e.g., SOFCs electrodes) and in reactions that use or produce synthesis gas.

29 Claims, 31 Drawing Sheets

U.S. PATENT DOCUMENTS

| | | | |
|---|---|---|---|
| 4,321,129 A | | 3/1982 | Bertus et al. |
| 4,343,658 A | | 8/1982 | Baker et al. |
| 4,404,087 A | | 9/1983 | Reed et al. |
| 4,478,791 A | | 10/1984 | Huang et al. |
| 4,731,221 A | | 3/1988 | Liu |
| 4,762,681 A | | 8/1988 | Tassen et al. |
| 4,822,699 A | * | 4/1989 | Wan ............................ 429/498 |
| 5,395,813 A | * | 3/1995 | Clavenna et al. ............. 502/335 |
| 5,406,014 A | | 4/1995 | Heyse et al. |
| 5,431,855 A | | 7/1995 | Green et al. |
| 5,599,517 A | | 2/1997 | Ul-Haque et al. |
| 5,833,838 A | * | 11/1998 | Heyse et al. ................ 208/48 R |
| 5,888,665 A | | 3/1999 | Bugga et al. |
| 5,983,675 A | | 11/1999 | McDonald |
| 6,207,609 B1 | | 3/2001 | Gao et al. |
| 6,531,053 B2 | | 3/2003 | Khare |
| 6,746,508 B1 | | 6/2004 | Deevi et al. |
| 6,811,904 B2 | | 11/2004 | Gorte et al. |
| 6,830,676 B2 | | 12/2004 | Deevi |
| 6,841,512 B1 | * | 1/2005 | Fetcenko et al. ............. 502/335 |
| 2002/0022160 A1 | | 2/2002 | Schmidt |
| 2002/0179495 A1 | * | 12/2002 | Heyse et al. .................. 208/137 |
| 2003/0096880 A1 | * | 5/2003 | Wang et al. ................... 518/714 |
| 2003/0165732 A1 | | 9/2003 | McElroy |
| 2004/0001994 A1 | | 1/2004 | Marina et al. |
| 2004/0121219 A1 | | 6/2004 | Mei et al. |
| 2005/0089738 A1 | | 4/2005 | Tao et al. |

FOREIGN PATENT DOCUMENTS

| | | |
|---|---|---|
| WO | WO0169701 | 9/2001 |
| WO | WO2006044313 | 4/2006 |

OTHER PUBLICATIONS

Trimm, "Coke formation and minimisation during steam reforming reactions," Catalysis Today, V. 37, pp. 233-238, 1997.

Claridge et al., "New Catalysts for the Conversion of Methane to Synthesis Gas: Molybdenum and Tungsten Carbide," Jnl. of Catalysis, V. 180, pp. 85-100, 1998.

Ghosh, "Thermodynamic Modeling of the Nickel-Lead-Tin System," Metall. and Materials Trans. A., V. 30A, pp. 1481-1494, Jun. 1999.

Shabaker et al., "Aqueous-phase reforming of oxygenated hydrocarbons over Sn-modified Ni catalysts," Jnl. of Catalysis, V. 222, pp. 180-191, 2004.

Gorte et al., "Novel SOFC anodes for the direct electrochemical oxidation of hydrocarbons," Jnl. of Catalysis, V. 216, pp. 477-486, 2003.

McIntosh et al., "Role of Hydrocarbon Deposits in the Enhanced Performance of Direct-Oxidation SOFCs," Jnl. of the Electrochem. Soc., V. 150, No. 4, pp. A470-A476, 2003.

PCT/US2006/019536, International Search Report and Written Opinion of the International Searching Authority, Apr. 2007.

Ghosh, Thermodynamic Modeling of the Nickel-lead-Tin System, Metallurgical and Materials Transactions A, V. 30A, pp. 1481-1494, Jun. 1999.

Onda et al., "Characterization and catalytic properties of Ni-Sn intermetallic compounds in acetylene hydrogenation," Phys. Chem. Chem. Phys., V. 200, No. 2, pp. 2999-3005, Jun. 2000.

Siewert et al., "Formation and Growth of Intermetallics at the Interface Between Lead-free Solders and Copper Substrates," NIST, Boulder CO, Jun. 2003.

\* cited by examiner a)

b)

METHOD OF DRY REFORMING A REACTANT GAS WITH INTERMETALLIC CATALYST

This invention was made with Government support under Contract No. DAAD19-01-1-0566, awarded by the Army Research Office. The Government has certain rights in the invention.

FIELD OF INVENTION

The present invention relates to materials used as electrodes and/or catalysts, as well as methods associated with the same.

BACKGROUND OF THE INVENTION

Coking refers to the decomposition of a hydrocarbon species into a solid mass consisting largely of carbon. This process can be promoted under conditions where a hydrocarbon is heated to elevated temperatures in the absence of hydrogen or an oxidant such as carbon dioxide, steam, or oxygen. The decomposition can be detrimental for various materials, such as catalysts, and can occur homogeneously or can be promoted over a heterogeneous catalytic surface.

Catalysts are materials used to promote a chemical reaction without being consumed. Commonly, a solid catalyst is used in the transformation of a liquid or gases species. Coking of hydrocarbons over a heterogeneous, solid catalyst often leads to a deactivation of the catalyst activity. Further, coke formation may cause mechanical damage to the catalyst particle leading to substantial pressure drop through the reaction vessel. Once the mechanical integrity of a catalyst is damaged, the catalyst typically needs to be replaced even if the catalyst activity could be recovered through a regeneration event.

Coking can occur over both oxide-based as well as metal-containing catalysts. Examples of reactions wherein coke formation over metal surfaces can be problematic include, for example, dry reforming and steam reforming. The steam reforming of methane and carbon dioxide or dry reforming of methane can be illustrated with the following equations:

(1)

(2)

In general, the carbon that may be formed can either be amorphous or crystalline/graphitic in nature. Crystalline coke may be produced from carbon which has been incorporated and then expelled from the metal. Although this is useful for the manufacture of carbon nanotubes, this dissolution and crystallization process can be damaging to the mechanical integrity of the catalyst. Graphitic coke is also more challenging to gasify than amorphous species. Similar coking problems often arise in the metal reactor tubes and heat exchangers used to process the reaction chemistry. Coking on these surfaces lowers the heat transfer into the reaction medium and can lead to both metal embrittlement as well as metal loss through dusting.

Beyond chemical transformations over heterogeneous catalysts and respective process equipment, coking may also be problematic for high temperature fuel cells that process hydrocarbon feed stocks. The presence of hydrocarbons at elevated temperatures also leads to the propensity to coke, which may limit such fuel cells to the use of hydrogen as the fuel source. However, a hydrogen fuel distribution network currently does not exist, and hydrogen storage has been a major materials and engineering challenge. Fuel cells which utilize a reforming step to produce $H_2$ gas also require that the fuel cell power plant contains fuel reformers. Eliminating the reforming units would simplify the devices and may present significant benefits in costs savings and energy efficiency. The main obstacle to utilizing a hydrocarbon feed for SOFC power generation is the high nickel content in the traditional anode cermets such as Ni/YSZ. This material undergoes rapid coking which impairs performance and often causes mechanical damage to the electrolyte and/or fuel cell assembly.

Solid oxide fuel cells hold much promise for the direct conversion of hydrocarbon fuel to electricity. To allow for direct hydrocarbon feeds, the anode design may substitute nickel in the common cermet anodes with alternative electronic conductors that might be less prone to coking. Whereas efforts by others have accomplished this to some extent by replacement of nickel with other metals, it has required modification of standard synthetic techniques that may have deleterious effects on both durability and cost of the fuel cell. For example, some strategies have employed numerous impregnation cycles into a porous oxide host post electrolyte densification to metal volume percents typically around 15 volume percent.

Accordingly, improved materials and methods are needed.

SUMMARY OF THE INVENTION

The present invention relates to materials used as electrodes and/or catalysts, as well as methods associated with the same.

The present invention relates to electrochemical devices comprising at least one electrode comprising an alloy or an intermetallic compound, wherein the alloy or intermetallic compound comprises a transition metal and a metal additive selected from among at least one of Sn, Ge, In, Tl, Ga, Pb, As, Sb and Bi, or any combination of one or more of these, wherein the transition metal is nickel, iron, or cobalt, and wherein the device is a fuel cell.

Another aspect of the present invention provides methods comprising processing a fuel in an electrochemical device comprising at least one electrode comprising an alloy or an intermetallic compound, wherein the alloy or the intermetallic compound comprises a transition metal and a metal additive selected from among at least one of Sn, Ge, In, Tl, Ga, Pb, As, Sb and Bi, or any combination of one or more of these, wherein the transition metal is nickel, iron, or cobalt, and wherein the device is a fuel cell.

Another aspect of the present invention provides methods comprising contacting a reactant gas with a catalytic material comprising an alloy or an intermetallic compound, the alloy or the intermetallic compound comprising a transition metal and a metal additive selected from among at least one of Sn, Ge, In, Tl, Ga, Pb, As, Sb and Bi, or any combination of one or more of these, wherein the additive is present in an amount less than 50 mol % of the alloy or the intermetallic compound and wherein the contacting takes place at 600° C. or higher; and allowing the reactant gas to undergo a chemical reaction with the catalytic material to produce a desired product.

Other aspects, embodiments and features of the invention will become apparent from the following detailed description of the invention when considered in conjunction with the accompanying drawings. The accompanying figures are schematic and are not intended to be drawn to scale. In the figures, each identical or substantially similar component that is illustrated in various figures is represented by a single numeral or notation. For purpose of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions will control.

DETAILED DESCRIPTION

Figure 1:
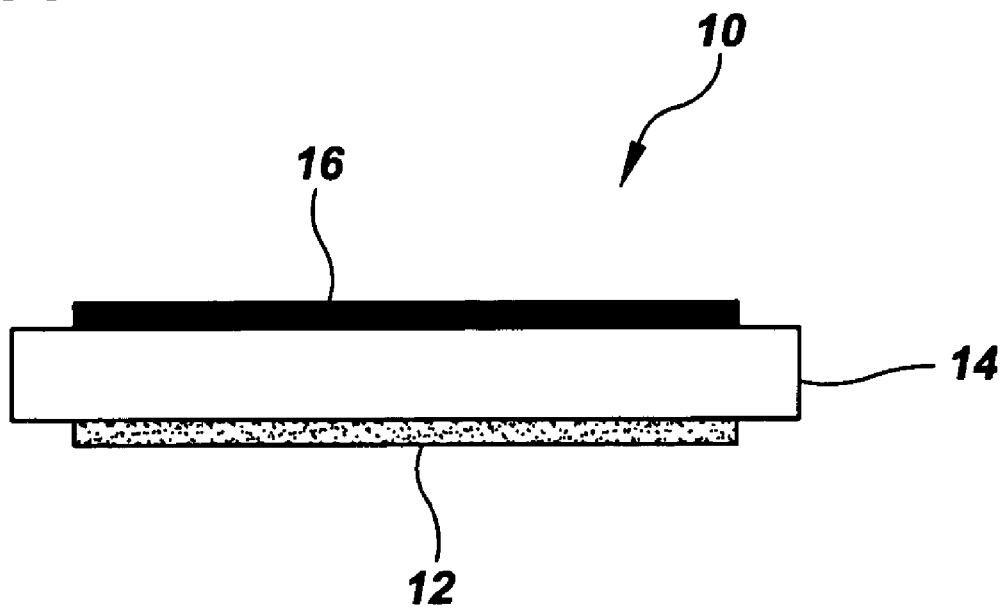
FIG. 1 shows, schematically, an electrolyte-supported fuel cell according to one embodiment of the invention.

The present invention relates to materials used as electrodes and/or catalysts, as well as methods associated with the same. The materials (e.g., alloys, intermetallic compounds) may comprise a transition metal (e.g., Ni) and a metal additive (e.g., Sn). The transition metal and additive are selected, as described further below, to provide improved electrode and/or catalytic performance. For example, the materials of the invention may have a high catalytic activity, while being less susceptible to coking than previous electrode/catalytic materials. These performance advantages can simplify the equipment used in certain applications (e.g., fuel cells, catalysts), as well as reducing energy and capital requirements. Further, the materials may be manufactured using traditional ceramic processing methods, without the need for complex, unconventional fabrication methods. The materials are particularly suitable for use in fuel cells (e.g., SOFCs) and catalysts for high temperature applications (e.g., dry reforming, production of synthesis gas, etc.).

The present invention may be advantageous in that materials described herein may substantially reduce undesirable side reactions at high temperatures that may diminish the performance of the materials, for example, in fuel cells or in catalyst applications. In some cases, the present invention may provide materials and methods that substantially reduce the high-temperature formation of carbon (e.g., coking), such as filamentous, crystalline, or graphitic carbon, on metal surfaces employed as electrode materials and catalysts. In some embodiments, the ability to suppress the formation of filamentous or crystalline carbon (e.g., coke) may be particularly advantageous for electrode and catalyst processes. For example, coke formation may damage the mechanical structure of catalysts and/or electrodes in high-temperature applications (e.g., fuel cells, catalysts), as well as reduce the activity of electrode and catalyst materials. However, materials of the present invention may remain mechanically rigid and retain sufficient activity, even upon exposure to dry hydrocarbon streams or other carburizing environments at high temperatures. For example, in one embodiment, an electrode material of the present invention may retain sufficient conductivity and mechanical rigidity for use in solid oxide fuel cells. In another embodiment, a catalyst material of the present invention may retain sufficient catalytic activity at high temperatures for the production of synthesis gas.

In some embodiments, the present invention relates to electrochemical devices comprising at least one electrode comprising an alloy or an intermetallic compound, wherein the alloy or intermetallic compound comprises a transition metal and a metal additive selected from among at least one of Sn, Ge, In, Tl, Ga, Pb, As, Sb and Bi, or any combination of one or more of these, wherein the transition metal is nickel, iron, or cobalt, and wherein the device is a fuel cell (e.g., solid oxide fuel cell (SOFC)). In some cases, the transition metal is nickel and the metal additive is Sn, Ge, or Sb. In some cases, the transition metal is nickel and the metal additive is Sn. The term "alloy" is given its ordinary meaning in the art, and refers to a combination (e.g., solid, solid solution) of two or more elements, wherein at least one element is a metal, and wherein the resulting material has metallic properties. As used herein, the term "intermetallic compound" is given its ordinary meaning in the art, and refers to a material (e.g., chemical compound) formed between two or more metals and/or a metal and nonmetal, wherein the material comprises a crystal structure that is different from those of the constituents. Intermetallic compounds may comprise both metallic bonds, as well as covalent and/or ionic bonds, which may lead to a material having a combination of both metal and ceramic properties. In some embodiments, intermetallic compounds can have a formula $A_xB_y$, where A is a transition metal and B is selected from among at least one of Sn, Ge, In, Tl, Ga, Pb, As, Sb, and Bi, or any combination or one of more of these. Typically, x and y are integers, though x and y may also be non-integers. Intermetallic compounds have ordered structures of specific composition such as $Ni_3Al$, though, like ceramic systems, intermetallic compounds can have a range of compositions (e.g., via dopant addition) that may exhibit varying properties, such as different melting temperatures, for example.

Figure 2:
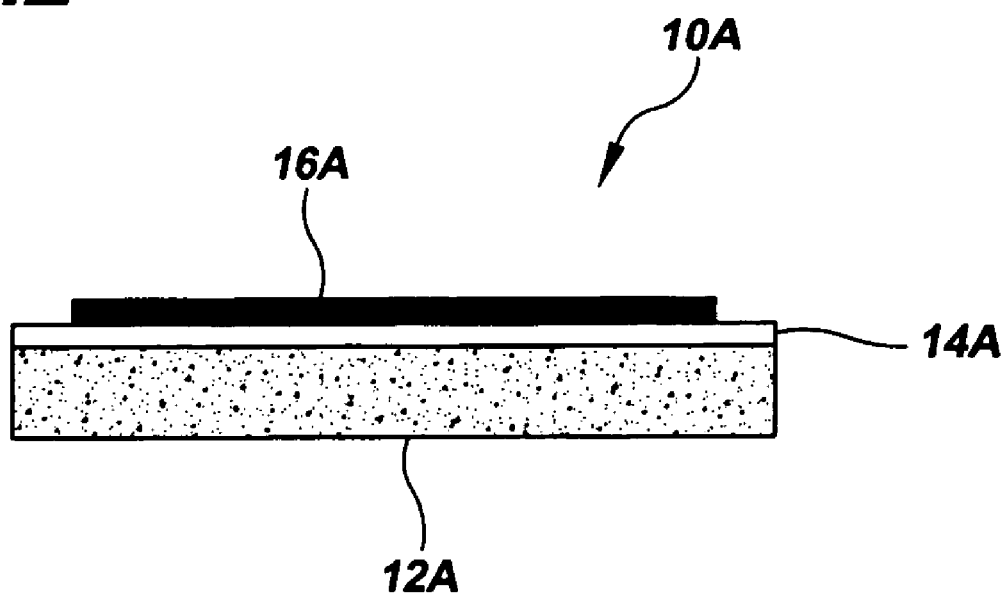
FIG. 2 shows, schematically, an anode-supported fuel cell according to one embodiment of the invention.

Electrochemical devices (e.g., fuel cells) of the present invention typically include two electrodes (e.g., a cathode and an anode) and an electrolyte there between. FIG. 1 and FIG. 2 illustrate two fuel cell (e.g., SOFC) architectures. An electrolyte-supported fuel cell 10 is illustrated in FIG. 1. In the embodiment shown, fuel cell 10 includes an anode 12 and a cathode 16. An electrolyte 14 is formed between the anode and the cathode. For example, the electrolyte may be formed by depositing suitable electrolyte material (described further below) on the cathode and the anode can be formed by depositing suitable anode material on the electrolyte.

The orientation of the components can be varied and it should be understood that there are other embodiments in which the orientation of the layers is varied such that, for example, the anode layer or the electrolyte layer is formed first. In some embodiments, the cathode and/or anode and/or electrolyte can be deposited as thin films. In other embodiments, the electrolyte (e.g., yttria-stabilized zirconia) is tape-casted and sintered, followed by screen-printing of the electrodes.

FIG. 2 generally illustrates an electrode-supported fuel cell 10A, wherein one of the electrodes is made of sufficient thickness to support the electrolyte (as well as the other portions of the structure). In this embodiment, the electrode-supported fuel cell is an anode-supported fuel cell (e.g., SOFC) such that anode 12A provides the support for electrolyte 14A (e.g., a thin YSZ electrolyte). Cathode 16A is formed on the electrolyte. In certain embodiments, the electrolyte is deposited on the anode and the cathode is deposited on the electrolyte layer.

The orientation of the components can be varied and it should be understood that there are other embodiments in which the orientation of the layers is varied. For example, in another embodiment, the electrode-supported fuel cell is a cathode-supported fuel cell. In one embodiment, a cathode-supported SOFC comprises a 1-2 mm thick cathode which may be used to support a 10-40 µm-thick electrolyte. In another embodiment, the electrolyte may be introduced by chemical vapor deposition (CVD) onto a sintered $La_{0.8}Sr_{0.2}MnO_3$ (LSM) tube. Anode-supported SOFCs may be advantageous since they do not require special fabrication techniques (e.g., chemical vapor deposition (CVD)) and they allow for ultra-thin electrolyte to be formed.

In certain embodiments, a porous material (or a material altered to become porous) may be used to form or to modify at least a portion of any of the above-described components of the fuel cell (e.g., cathode, anode, and electrolyte). As used herein, a "porous" material is defined as a material having a sufficient number of pores or interstices such that the material is easily crossed or permeated by, for example, a gas or mixture of gases. In the present invention, a porous material may advantageously facilitate the diffusion of gases to each of the active layers of the fuel cell. For example, the use of porous material may enhance fuel cell performance by providing access for the gases to the bottom layer of a fuel cell in a stacked configuration of layers. In one embodiment, the porous material is chemically inert to the fuel. In another embodiment, the porous material is chemically active to the fuel (e.g., can perform a reduction and/or an oxidation, or can transport either positively or negatively charged ions or both between two electrodes). In one embodiment, a portion or all of at least one of the cathode, anode, and electrolyte is porous. In another embodiment, a support for either the cathode or anode (not shown) is porous.

However, it should be understood that not all embodiments of the invention include a porous material.

Compositions of the anode, cathode and electrolyte are described further below. In some cases, it may be preferable for the compositions of these components to have a thermal coefficient of expansion similar to those of the other components of the fuel cell to promote adhesion and prevent separation of the components at various temperatures. In some instances, materials with dissimilar thermal expansion coefficients may expand and contract at different rates and amounts with changes in temperature, which can cause stress and delamination of the components.

Anode 12 may be formed in any geometrical form that is suitable for a particular device application. For example, in some embodiments the anode is deposited as a substantially planar, rectangular thin film. In some embodiments, the anode is deposited as an interdigitated electrode or as a spiral. In some embodiments, the anode material may not react (e.g., chemically react with the electrolyte, melt, form species that significantly inhibit power performance, etc.) at or below temperatures required for fabrication of the fuel cell. For example, in one embodiment, the anode may not chemically react with the electrolyte (e.g., YSZ) at the electrolyte sintering temperature (e.g., 1400° C.). In another embodiment, the anode material may not melt at temperatures below any temperature required for fabrication of the fuel cell.

In general, anode 12 comprises a material suitable for performing an oxidation reaction which is also chemically compatible with the electrolyte (e.g., chemically inert to the electrolyte, matches the thermal expansion coefficient of the electrolyte, etc). The anode may have various roles in the electrochemical oxidation of the fuel. First, it may conduct oxygen ions from the electrolyte to the reaction zone. Secondly, it may conduct the electrons produced from oxidation to the current collector. Thirdly, it may possess high catalytic activity. Ideally, an anode material may have good low-temperature activity, good electronic and ionic conductivity, and a thermal expansion coefficient similar to the electrolyte.

In certain preferred embodiments, the electrode (e.g., SOFC anode) comprises an alloy or an intermetallic compound which comprises both a transition metal and a metal additive. Suitable transition metals include nickel, iron, or cobalt with nickel being particularly preferable in certain embodiments. In some embodiments, the metal additive may be selected from among Sn, Ge, In, Tl, Ga, Pb, As, Sb, or Bi, or any combination thereof.

In some embodiments, it may be preferable that the metal additive be Sn, Ge, or Sb, or any combination thereof. In some embodiments, the additive may be present in the alloy or the intermetallic compound in an amount less than 50 mol % of the alloy or the intermetallic compound. In some embodiments, the additive may be present in the alloy or the intermetallic compound in an amount between 25 mol % and 50 mol %. In some embodiments, the additive may be present in the alloy or the intermetallic compound in an amount between 25 mol % and 40 mol %. In some embodiments, the additive may be present in the alloy or the intermetallic compound in an amount between or 30 mol % and 40 mol % of the alloy or the intermetallic compound. The amount of metal additive used in the present invention may be selected to provide sufficient conversion of at least a portion of the metal (e.g., transition metal) to an intermetallic compound. Without wishing to be bound by theory, it is believed that the relatively high levels of metal additives (e.g., Sn) utilized in certain embodiments of the invention may provide certain advantages over previous materials and methods, including the mitigation of coke formation or prevention of crystalline carbon whisker formation at high temperature conditions. In certain preferred embodiments, tin may be used as an additive to nickel at 40 mol % or lower, or in an amount sufficient to form $Ni_3Sn$ or $Ni_3Sn_2$ intermetallic compounds. In other embodiments, combinations of metal additives can be chosen at levels to form solid solutions, such as the solid solution between $NiSb$—$Ni_3Sn_2$ intermetallic compounds. Those of ordinary skill in the art would be able to select combinations of such metal additives to form solid solutions without undue experimentation. In some embodiments, the intermetallic compound formed may be a solid at the desired operating temperature of the electrochemical device.

In some cases, the transition metal and metal additives are included in the formulation using precursors such as metals, alloys, oxides, mixed oxides, sulfides, organometallic compounds, inorganic salts, and the like. In some embodiments, the transition metal and metal additive source employed are oxides which are subsequently reduced at elevated temperatures to form an alloy or intermetallic compound before application. In certain embodiments, it may be preferred that the metal additive precursor be able to remain a solid at high temperatures. For example, the metal additive precursor may be tin oxide, which has a melting point of 1630° C.

It should be understood that the alloy or the intermetallic compound may include other components, typically in relatively minor quantities (i.e., less than 10 mol %). For example, in certain embodiments, materials of the invention may further comprise a refractory additive. As used herein, a "refractory additive" may be any metal which, when added to a material, such as a metal, alloy, or intermetallic compound, raises the melting point of the material. Examples of suitable refractory additives include, but are not limited to W, Mo, Nb, Ta, Al, Ti, and Cr. Other additives may be used to modify properties such as intermetallic agglomeration, sulfur tolerance, oxidation resistance, and the like. Those of ordinary skill in the art would be able to select various additives to suit a particular desired property. For example, a refractory metal additive may be used to limit intermetallic agglomeration. Germanium, antimony, or zinc may be added to the intermetallic portion of the anode to increase sulfur tolerance. Additionally, aluminum, silicon, chromium, titanium may be added to the intermetallic portion of the anode to increase oxidation resistance of the anode.

In some embodiments, the electrode (e.g., SOFC anode) further comprises a ceramic material phase in addition to the alloy or the intermetallic compound. The ceramic phase may be an ionic conductor. Examples of suitable ceramic materials include, but are not limited to, metal carbides, doped zirconia (i.e., YSZ), ceria, doped ceria, perovskites, and doped perovskites, amongst others.

In one particularly preferred embodiment, the anode of a SOFC comprises an intermetallic compound of nickel and tin (Ni—Sn), such that tin is present in an amount of 40 mol % or less in the intermetallic compound, and that intermetallic compound is mixed with YSZ.

In some embodiments, the melting point of the alloy or the intermetallic compound may be greater than 500° C.; or greater than 600° C.; or greater than 700° C.; or greater than 800° C.; or greater than 850° C.; or greater than 900° C.; or greater than 1000° C.

In some embodiments, the alloy or the intermetallic compound may be present in the electrode at 10-60 vol % of the electrode. In other embodiments, the alloy or the intermetallic compound may be present in the electrode at 30-40 vol % of the electrode. For example, in one embodiment, the alloy or the intermetallic compound may be present in the electrode at above 30 vol % of the electrode to increase the electrical conductivity of the electrode.

In certain embodiments, at least a portion of the electrode material may be porous or modified to become porous. In one embodiment, the electrode material may be porous and may retain its porosity at or below temperatures required for the fabrication and operation of the fuel cell.

Cathode 16 may be deposited in any geometrical form that is suitable for a particular device application. In some cases, it is preferred to utilize a thick cathode having a thickness of 1-5 mm. In other cases, a thin film is preferred. In some embodiments, the cathode layer is deposited as an interdigitated electrode or as a spiral.

The cathode performs a reduction reaction and can comprise any material capable of performing such a reaction. In some embodiments, the cathode layer is capable of reducing oxygen to $O^{2-}$ ions. The cathode may be a selective cathode that does not perform an oxidation reaction under the same or similar reaction conditions. Suitable cathode materials are known to those of ordinary skill in the art. Examples of materials suitable for the cathode layer may include doped perovskites such as $Sm_{0.5}Sr_{0.5}CoO_3$, $Ba_{0.8}La_{0.2}CoO_3$, $Gd_{0.5}Sr_{0.5}CoO_3$, and $La_{0.8}Sr_{0.2}MnO_3$. In some embodiments, the cathode layer can include a noble metal such as platinum or gold, a cermet like copper or nickel dispersed on ceria, or other mixed ionic-electronic conductors. In some embodiments, the cathode may comprise a ceramic material phase in addition to a metal phase.

In some embodiments, it may be possible for the cathode material to comprise the alloys or intermetallic compounds as described herein. For example, the cathode material may comprise an intermetallic compound which comprises both a transition metal and a metal additive chosen from Sn, Ga, In, Tl, Ge, Pb, As, Sb, and Bi.

The cathode may be formed through chemical and physical routes including thin-film techniques such as spin-on methods, chemical vapor deposition, pulsed laser deposition, sputtering, evaporation, molecular beam epitaxy, or any method known to those of ordinary skill in the art. In certain embodiments, the cathode layer is attached to a conductive connector or connectors for passing current.

Electrolyte layer 14 may be deposited in any geometrical form that is suitable for a particular device application. For example, in some embodiments the electrolyte layer is deposited as a substantially planar, thin film. A planar thin film may be of any shape and can be, for example, rectangular, circular or can be shaped to conform to an irregularly shaped substrate. In other embodiments, the electrolyte is tubular.

The electrolyte can comprise any material capable of transporting either positively or negatively charged ions or both between two electrodes and should be chemically compatible with the electrodes. In one set of embodiments, the electrolyte comprises a solid oxide that is capable of conducting oxygen ions from cathode to anode. In another set of embodiments, the electrolyte comprises a solid oxide that is capable of conducting protons. In another embodiment, the electrolyte comprises a solid oxide that is capable of conducting carbonate ions. In another set of embodiments, the electrolyte comprises a single crystal or polycrystalline solid. In some embodiments, the electrolyte may be an ionic conductor. Examples of suitable electrolyte materials include, but are not limited to, YSZ (yttria-stabilized zirconia), alternatively doped zirconia (such as calcium, magnesium, or scandium stabilized zirconia), doped lanthanum gallate, doped lanthanum aluminate, gadolinium titanate, gadolinium zirconate, doped cerium oxide, doped bismuth oxide, doped barium cerate, doped barium zirconate, and the like. In some embodiments, it may be particularly preferred for the electrolyte to comprise yttria-stabilized zirconia.

The electrolyte layer 14 may be deposited through chemical and physical routes such as thin-film techniques including spin-on methods, chemical vapor deposition, pulsed laser deposition, sputtering, evaporation, molecular beam epitaxy, or any method known to those of ordinary skill in the art.

The thickness of the electrolyte may be varied to suit a particular application. For example, in an electrode-supported fuel cell, the thickness of the electrolyte may be 100 micron or less, or 50 microns or less (e.g., between 10 micron and 40 micron). In electrolyte-supported fuel cell, the thickness of the electrolyte is typically greater than 100 micron, and often times significantly greater.

It should be understood that fuel cells of the invention may include other components not illustrated in the figures. For example, a buffer layer or other active layer can be positioned between certain components.

Also, though the electrode materials of the invention are described in connection with a fuel cell, it should be understood that the materials may also be suitable for use in other types of electrochemical devices including batteries, membranes and sensors, amongst others.

Electrochemical devices of the invention may be advantageous in that the devices may be fabricated entirely by conventional ceramic processing. Furthermore, devices of the invention may demonstrate exceptional dimensional stability and good power generation when operated on humidified methane at high temperatures.

Another aspect of the invention provides a method for processing a fuel in an electrochemical device. In one embodiment, the invention provides a method for processing fuel (e.g., dry reforming of a hydrocarbon fuel) in a fuel cell (e.g., SOFC), wherein the fuel cell comprises at least one electrode that comprises the transition metal/metal additive intermetallic compound described above. In one particularly preferred embodiment, the method involves oxidizing a fuel at the anode of an anode-supported solid oxide fuel cell, wherein the anode has a composition noted above.

Typically, during use, the electrochemical device may be attached to a fuel supply (e.g., hydrocarbons, hydrogen, etc). In one embodiment, the fuel supply comprises a hydrocarbon, such as methane. In some cases, the fuel supply comprises dry methane (i.e., methane which does not comprise steam). Other examples of suitable fuel supplies include, but are not limited to, hydrocarbons mixed with carbon dioxide, hydrocarbons mixed with steam, methane mixed with carbon dioxide, methane mixed with steam, fuel supplies which contain sulfur impurities (e.g., $H_2S$), and/or fuel supplies which may typically undergo coking at elevated temperatures using conventional techniques. One advantage of the present invention is that coking may be limited using such fuels.

Advantageously, fuel cells of the present invention may be easily fabricated. For example, in the fabrication of an anode-supported fuel cell shown in FIG. 2, the anodes can be co-fired to the sintering temperature of the electrolyte (e.g. YSZ) without undesired interfacial reactions. The cathode may be subsequently applied at a lower temperature to prevent interfacial reactions. Other advantages of fuel cells of the present invention include minimization or prevention of coking and tolerance to sulfur impurities.

Furthermore, fuel cells of the present invention may be useful in preventing the formation of crystalline, filamentous, or graphitic carbon from a hydrocarbon feed or supply stream on the electrodes. For example, at high temperatures, crystalline carbon (e.g., coke) can be formed on the surface of a metal electrode, for example, in a fuel cell. In some cases, at least some of the crystalline carbon may also be formed beneath the surface of the metal electrode. The coke is subsequently expelled from the metal electrode as a crystalline or filamentous carbon whisker. Typically, crystalline carbon is more difficult to remove (e.g. gasify) from metal surfaces and is more damaging to the mechanical integrity of the electrode structure than amorphous carbon.

In some embodiments, electrodes of the present invention (e.g., Ni—Sn intermetallic compounds) substantially suppress the formation of crystalline carbon over a transition metal surface used for catalyst or electrode purposes. In one embodiment, fuel cells of the present invention may minimize the formation of crystalline carbon on the surface of nickel. In another embodiment, fuel cells of the invention promote the formation of amorphous carbon over crystalline carbon such that the amorphous carbon can be easily removed or gasified. In certain embodiments, electrochemical devices (e.g., fuel cells) of the invention exhibit improved coking resistance.

Another aspect of the present invention provides methods for catalytic processes. In some cases, materials of the invention may be useful for catalysts for high-temperature reactions (e.g., 600° C. or higher) that are prone to coke formation. Accordingly, methods of the invention may comprise contacting a reactant gas with a catalytic material comprising an alloy or an intermetallic compound, the alloy or the intermetallic compound comprising a transition metal and a metal additive selected from among at least one of Sn, Ge, In, Tl, Ga, Pb, As, Sb and Bi, or any combination of one or more of these, wherein the additive is present in an amount less than 50 mol % of the alloy or the intermetallic compound and wherein the contacting takes place at 600° C. or higher, and allowing the reactant gas to undergo a chemical reaction with the catalytic material to produce a desired product.

For example, alloys and intermetallic compounds as described herein may be used as catalysts for dry reforming, steam reforming, cracking, dehydrogenation, methane coupling, oxidation of hydrocarbons (e.g., partial oxidation), conversion of synthesis gas, production of synthesis gas, and the like. It should be understood that the catalytic materials of the invention may also be used in other catalytic applications at both high temperatures and low temperatures. For example, the catalytic materials may be used in Fischer-Tropsch synthesis. Catalyst materials of the invention may employ dopants or promoters, as known to those of ordinary skill in the art. Further, the intermetallic portion of the catalyst materials may include additives as described herein to improve the textural properties, sulfur tolerance, and oxidation resistance of the catalyst.

In a particular embodiment, methods for catalytically processing fuel streams are provided. For example, methods of the invention may be particularly useful for processing fuel streams wherein coking readily occurs. In some cases, the methods involve dry reforming (i.e., carbon dioxide reforming) of hydrocarbon gases. As used herein, "dry reforming" refers to the oxidation of a hydrocarbon fuel in the presence of carbon dioxide. In some cases, dry reforming occurs in the presence of steam (e.g., such that the carbon dioxide to steam ratio may be less than 1). In some cases, dry reforming occurs in the presence of oxygen. In some cases, it may be preferable for the dry reforming to occur with little or substantially no amount of steam or oxygen present. For example, dry reforming may involve the conversion of methane and carbon dioxide to carbon monoxide and hydrogen in the presence of a catalytic material.

In one embodiment, the invention relates to a method wherein the dry reforming of a hydrocarbon fuel is performed using a catalytic material which comprises the transition metal/metal additive compositions described herein. As described above in connection with electrode materials, the catalytic material may further comprise an ionic conductor such as YSZ. In other embodiments, the catalytic material further comprises a refractory metal oxide, such as alumina or other refractory metal oxides, for example. In other embodiments, the catalytic material further comprises a metal oxide, sulfated metal oxide, or carbide that may participate in the catalytic reaction.

In some embodiments, the catalytic reaction may be performed at greater than 600° C.; or greater than 700° C.; or, greater than 800° C., or greater than 900° C.

In some embodiments, the alloy or the intermetallic compound may be present in the catalytic material at 0.5-40 vol % of the catalytic material. In other embodiments, the alloy or the intermetallic compound may be present in the catalytic material at 10-15 vol % of the catalytic material. For example, in one embodiment, the alloy or the intermetallic compound may be present in the catalytic material at above 40 vol % of the catalytic material to increase the loading of catalytic surfaces in the catalytic material.

In some embodiments, the catalytic material is exposed to a fuel supply such that the catalytic material performs dry reforming of the fuel. Examples of different fuel supplies include a hydrocarbon and carbon dioxide, methane and carbon dioxide, a mixture of methane, carbon dioxide, and steam, or other fuel supplies which comprise sulfur or sulfur-containing impurities (e.g., $H_2S$).

As described herein, methods of the invention may perform catalytic processes, including dry reforming of hydrocarbons or any fuel supply or stream which may readily coke at elevated temperatures, with the advantages of minimized coking, suppression of crystalline carbon formation at high temperatures, and/or increased tolerance to sulfur.

While several embodiments of the invention have been described and illustrated herein, those of ordinary skill in the art will readily envision a variety of other means and structures for performing the functions and/or obtaining the results or advantages described herein, and each of such variations, modifications and improvements is deemed to be within the scope of the present invention. More generally, those skilled in the art would readily appreciate that all parameters, materials, reaction conditions, and configurations described herein are meant to be exemplary and that actual parameters, materials, reaction conditions, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, provided that such features, systems, materials and/or methods are not mutually inconsistent, is included within the scope of the present invention.

In the claims (as well as in the specification above), all transitional phrases or phrases of inclusion, such as "comprising," "including," "carrying," "having," "containing," "composed of," "made of," "formed of," "involving" and the like shall be interpreted to be open-ended, i.e. to mean "including but not limited to" and, therefore, encompassing the items listed thereafter and equivalents thereof as well as additional items. Only the transitional phrases or phrases of inclusion "consisting of" and "consisting essentially of" are to be interpreted as closed or semi-closed phrases, respectively. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood, unless otherwise indicated, to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements that the phrase "at least one" refers to, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All references cited herein, including patents and published applications, are incorporated herein by reference. In cases where the present specification and a document incorporated by reference and/or referred to herein include conflicting disclosure, and/or inconsistent use of terminology, and/or the incorporated/referenced documents use or define terms differently than they are used or defined in the present specification, the present specification shall control.

The following may represent examples of certain embodiments of the invention and are not intended to be limiting.

EXAMPLES

Example 1

Selection of Metal Additives to Improve Coke Tolerance of Ni/YSZ Cermets as Employed as an Anode-supported Architecture As known cathode materials typically react with YSZ under electrolyte densification conditions and it was preferable to employ only traditional fabrication techniques, an anode-supported solid oxide fuel cell architecture was prepared. As such, the precursor oxide used to later form the intermetallic compounds must remain solid to temperatures around 1400° C. Therefore, the relevant properties of the precursors of Sn, Ga, In, Tl, Ge, Pb, As, Sb, and Bi were investigated and reported in Table 1.

TABLE 1

Material properties of potential anode additives to improve the coke tolerance of Ni/YSZ cermets.

| Element | Sn | Ga | In | Tl | Ge | Pb | As | Sb | Bi |
|---|---|---|---|---|---|---|---|---|---|
| Oxide Melting Point (° C.) | 1630 | 1795 | 850s | 717 | 937 | 886 | 312 | 656 | 860 |
| Metal Melting Point (° C.) | 232 | 30 | 157 | 304 | 1086 | 328 | 613s | 631 | 271 |

Tin and gallium oxide presented sufficiently high melting points for some embodiments, including application in a traditionally processed anode-supported fuel cell. However, gallium can be expensive and can be extremely difficult to reduce to metal form with hydrogen below 1000° C., as would be preferred for this application. Metal forms having low melting points may still be employed, as long as an intermetallic compound forms with the transition metal. As described herein, the melting temperature of the intermetallic compound can be greater than those of its constituents. Therefore, the intermetallics of the Ni—Sn system were explored. A phase diagram for the Ni—Sn system is given in *Thermodynamic Modeling of the Nickel-Lead-Tin System* published in Metallurgical and Materials Transactions A, volume 30A pages 1481-1494, published in 1999. It should be understood that the present invention may also encompass other intermetallic compound systems. For example, other materials may be desired for different methods of cell fabrication or for other applications that did not require such a high fabrication temperature.

Materials described herein may be used as structural and sintering support for SOFCs, as the materials may provide sufficient chemical compatibility and electrochemical activity with devices and catalyst systems described herein.

As traditional ceramic processing may be employed, the anode formulation may preferably be compatible with processing of the ceramic phase (e.g., yttria-stabilized zirconia) and not react with the electrolyte. Also, the anode may preferably have sufficient electrical conductivity with well-matched mechanical properties in support of the ultra thin electrolyte.

Example 2

Design of Ceramic Anode Systems to Improve Coke Tolerance of Anode-Supported Architecture and Minimize Oxidation Damage Conductive ceramics may also be used within the scope of the invention. Chromate and titanate perovskites may be employed, for example, as they exhibit minimal dimensional changes upon reduction and oxidation. Chromate and titanate perovskites also possess appropriate thermal expansion coefficients and possess high electronic conductivity. These conductors may be mixed with ceria instead of yttria-stabilized zirconia to form a composite anode. Ceria has demonstrated sufficient electrochemical activity and may be preferred in certain applications. If required, transition metals may be added at low levels to enhance electrode performance.

To avoid interfacial reactions with yttria-stabilized zirconia and ceria, strontium content in the ceramic conductors may be minimized. For example, a lanthanum chromate may utilize magnesium doping at the B-site rather than Sr doping at the A-site. Mg doping at the B-site may also produce a lower thermal expansion coefficient (9.5×10⁻⁶ mm/mm/K) which may counteract the higher thermal expansion (12.3× 10⁻⁶ mm/mm/K) of ceria. For this formulation, La doping of ceria may occur and may lead to improved electrode performance.

Titanate-based perovskites can also be used as anode materials. La-doped $SrTiO_3$ has a thermal expansion coefficient similar to YSZ. It also has a high electronic conductivity when sintered in hydrogen, which is associated with the ability of $Ti^{+4}$ to be reduced to and stabilized as a +3 valence in a reducing atmosphere at high temperatures. Titanium is not reduced in an oxidizing atmosphere, and both the unreduced perovskite and the excess strontium oxide that segregates to the perovskite grains are insulating. Reactions (3) and (4) are represented in the following equations for 30 at % La doping at the A-site.

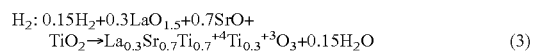

$$H_2: 0.15H_2 + 0.3LaO_{1.5} + 0.7SrO + TiO_2 \rightarrow La_{0.3}Sr_{0.7}Ti_{0.7}{}^{+4}Ti_{0.3}{}^{+3}O_3 + 0.15H_2O \qquad (3)$$

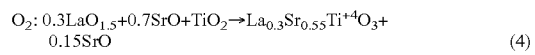

$$O_2: 0.3LaO_{1.5} + 0.7SrO + TiO_2 \rightarrow La_{0.3}Sr_{0.55}Ti^{+4}O_3 + 0.15SrO \qquad (4)$$

Constructing an anode-supported cell with strontium titanate may be difficult due to the processing required. YSZ cannot typically be sintered in a reducing atmosphere with strontium titanate, nor can it typically be processed in an oxidizing atmosphere due to its expected reactivity with the segregated strontium oxide. Also, in some cases, it may be difficult to reduce strontium titanate once it has been air-sintered. However, when used as a thin film, titanate-based anodes have been successfully applied subsequent to the electrolyte sintering. The use of the available lower adhesion temperatures post electrolyte densification may minimize potential reactivity due to strontium to form zirconates and may maintain a small grain size capable of being reduced after the bonding has been accomplished but requires a cathode or electrolyte supported architecture.

For a titanate system, La-doped calcium titanate may be selected. Calcium titanate may demonstrate high conductivity even after oxidative sintering and subsequent reduction at 900° C. Further, calcium may present reduced reactivity with YSZ-based electrolytes compared to strontium.

As traditional ceramic processing would be employed, the anode formulation may preferably be compatible with processing of the ceramic phase (e.g., yttria-stabilized zirconia) and not react with the electrolyte. Also, the anode may preferably have sufficient electrical conductivity with well-matched mechanical properties in support of the ultra thin electrolyte.

Example 3

General Synthesis of SOFC Test Cells

Nickel oxide and tin oxide were obtained from J. T. Baker and Alfa Aesar, respectively. $(La_{0.8}Sr_{0.2})_{0.98}MnO_3$, LSM and La-doped calcium titanate $(La_{0.2}Ca_{0.8}TiO_{3.1})$ were obtained from Praxair Specialty Oxides with a median particle size of 0.8 μm. Alfa Aesar glassy carbon particles (20-50 μm) were used as the porogen for the support. Carbon black, Cabot BP-120, was used to create fine porosity in the electrochemical active layer of the all ceramic cells. YSZ powders were obtained from Unitec and Tosoh (see Table 2). Tosoh powders are hard agglomerates of fine crystallites, whereas Unitec powders are dense fragments with higher tapping densities. High tapping density would facilitate a high green density for wet-coated laminates, reducing their shrinkage during densification. The densification temperatures listed in Table 2 referred to those observed for thin films deposited on anode supports that were not pre-sintered. The shrinkage resulting from anode densification may facilitate YSZ sintering. Thick ceramic preforms of YSZ would tend to require slightly higher sintering temperatures than anode-supported YSZ.

TABLE 2

Characteristics of commercial YSZ powders prepared by grinding (Unitec) and chemical coprecipitation (Tosoh).

| Source | Average Size (μm) | Tapping Density (g/ml) | Densification Temperature (° C.) |
|---|---|---|---|
| Tosoh 8YS | 0.4 | 1.6 | 1350 |
| Unitec-1 | 0.28 | 1.8 | 1350 |
| Unitec-2 | 0.65 | 2.1 | 1400 |
| Unitec-10 | 1.73 | 2.5 | >1450 |

Tosoh 8YS and Unitec-10 YSZ were used for the anode preparation. YSZ particle size has been shown to affect the conductivity, stability, porosity, strength, reoxidation ability and thermal expansion of nickel/YSZ cermets. For the electrolyte and cathode processing, Unitec-1 YSZ powder was preferred over the Tosoh 8YS YSZ powder.

Lanthanum chromate anodes were synthesized by coprecipitation of the nitrate precursor solution (0.2 M, Sigma). To prepare a composite, cerium salts were added to the lanthanum chromate precursor solution. The nitrate solution was slowly added to an aqueous tetraethylammonium hydroxide (TEAH) solution (35 wt %), which was dissolved in isopropanol (0.2 M). TEAH was used to precipitate the composite. After aging for over 24 h, the particles were collected, rinsed several times in isopropanol, and dried. The samples were then fired to 800° C., unless surface area modifications were required to control support shrinkage.

In preparing Sm-doped ceria, the metal nitrate precursor solution (0.8 M) was first added to a 0.4 M TEAH solution in isopropanol. The base-to-nitrate molar ratio was 1.5 based on the +3 valence state of the cerium salt. The mixture was aged for 30 minutes and centrifuged. The precipitate collected was rinsed three times in methanol using an IKA homogenizer. After the third rinse, the well-dispersed hydroxide suspension became difficult to centrifuge. After redispersion, the slurry was added to the chromate precipitate in methanol, and homogenized for 10 minutes.

For the SOFC tests, the various anode support compositions were milled with a carbon pore former and polyvinyl butyral (PVB) binder, pressed uniaxially into a pellet, and calcined at 1000° C. to provide for green strength. Anode active layers of similar composition, but reduced porosity, were applied through air brushing again fired to around 1000° C. Subsequently, a YSZ dispersion was air brushed onto the substrate and the resulting half-cell was then densified at 1350-1450° C. in a box furnace. Subsequently, the cathode material was ball-milled, applied with an air brush, and subjected to 1-h calcination at 1250° C. A mask was used to limit the cathode's electrochemical area to a diameter of 0.5 inches. The slurry was metered with a syringe pump to obtain a controlled calcined cathode thickness of 20 μm.

Example 4

General Characterization and Testing Procedures

Catalytic characterization of the anode materials was performed in a packed bed reactor. The reactor consisted of a ¼"-OD quartz tube suspended in an 18"-long single-zone furnace. The temperature was controlled using a quartz-sheathed K-type thermocouple located just below the catalyst bed. The catalyst was held in place between two quartz wool plugs. The feed streams were introduced using MKS mass flow controllers, and the product stream was analyzed with an Agilent 6890 gas chromatograph. The studies were conducted under a fuel-rich condition (methane-to-oxygen molar ratio=2), whereby full selectivity to combustion products would correspond to a maximum methane conversion of 25%. Selectivity to synthesis gas could increase the methane conversion to 100%.

The electrode materials (e.g., anode materials) were characterized by X-ray diffraction (XRD) (Siemens D5000). Crystalline plane spacings were calculated by Bragg's law, using an internal silver standard for peak reference. Porosity was measured using the Archimedes principle. SOFC microstructure was examined by scanning electron microscopy (SEM) (JEOL 5910). Dynamic light scattering (DLS) was used to analyze the particle size of the precipitates. Conductivity was characterized by 4-point conductivity tests (Keithley 236) in an atmosphere controlled by MKS mass flow controllers.

The SOFC systems were sealed using a glass composite, a 50:50 mixture (by weight) of Ferro F1040 glass and 8-μm YSZ (MEI). The powder mixture was made into a slurry using water glass, and applied around the edges of the cell to bind them to the alumina tube. The sealing was performed for two hours at 900° C., above the melting point of the glass. The cell was then cooled to the operating temperature of 800° C. for testing. This sealant has numerous advantages over known Aremco cements.

Cell testing was initiated with a humidified 5% hydrogen stream at the operating temperature for 4 h. The feed was then changed to humidified hydrogen (97%) for 30 min. Next, 0.5" plungers covered with gold or platinum mesh were lowered to the contact pads on the fuel cell. The contact pads on the cathode and anode were made from Pt paste (Engelhard A3788A) and Au paste (Engelhard T10112), respectively. The fuel and air flow rates were 150 ml/min and 550 ml/min, respectively. Electrochemical performance of the fuel cells was characterized using a Solartron 1287 pontentiostat.

Example 5

Application of Sm—$CeO_2$/La—$CaTiO_3$ Composites to Anode-Supported SOFC

Single-phase La-doped $CaTiO_3$ was developed as an anode support. A thin electrochemically active composite anode interlayer was then applied to introduce a doped ceria phase for improved performance. This separated the variables involved in the cell fabrication from those that affected the electrochemical performance.

Figure 30:
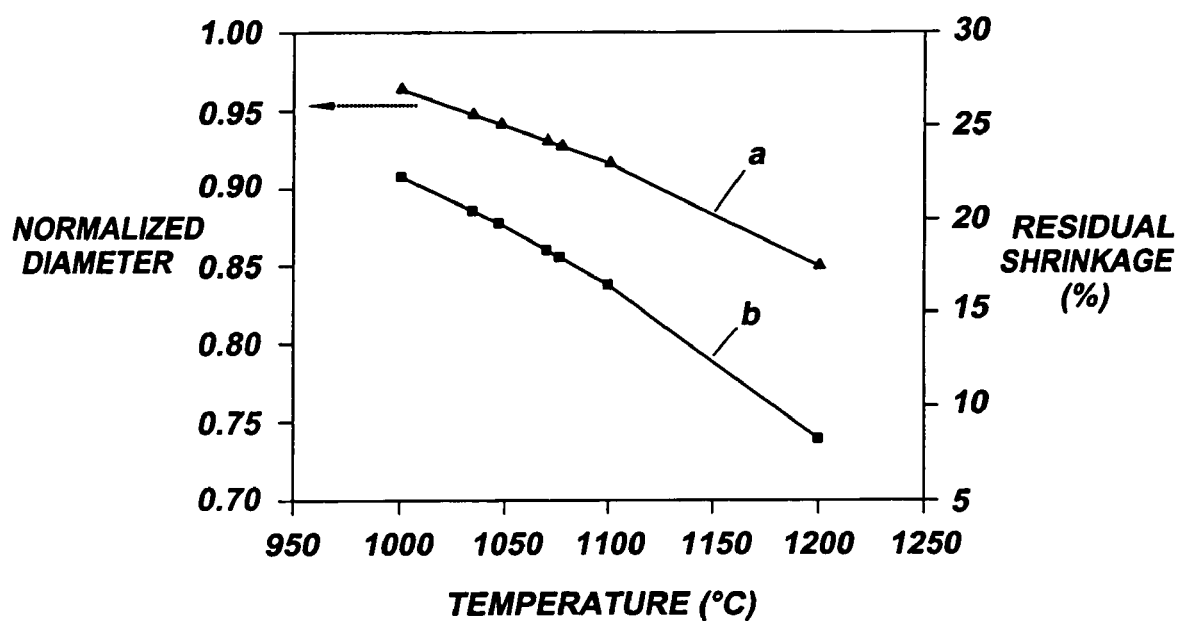
FIG. 30 shows (a) the normalized diameter and (b) the % residual shrinkage of calcium titanate anode support as a function of processing temperature.

By carefully controlling the processing of commercially derived La-doped $CaTiO_3$, a sintering curve was obtained, as shown in FIG. 30, which illustrates (a) the normalized diameter and (b) the % residual shrinkage of calcium titanate anode support as a function of processing temperature. To complete the SOFC fabrication, an interlayer was applied and calcined to the same temperature as the anode support. The precalcination temperature was determined by the sintering curve of the YSZ applied on the anode interlayer. The shrinkage required to obtain a dense YSZ layer was 16.8% for this system. This resulted in sufficiently flat button cells that could be tested. As the doped ceria and doped $CaTiO_3$ mixture sintered quite readily along with the YSZ electrolyte, porosity was introduced to the anode support using 20-50 μm glassy carbon.

Figure 4:
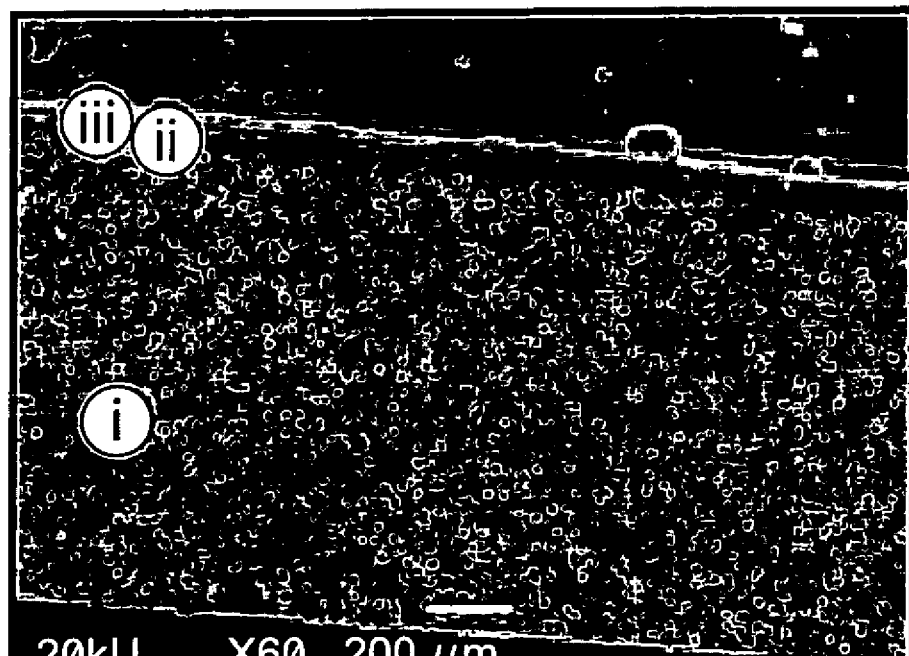
FIG. 4 shows scanning electron micrograph (SEM) images of cross-sections of (i) a La—$CaTiO_3$ anode, (ii) a Sm—$CeO_2$/La—$CaTiO_3$ composite anode interlayer, and (iii) a yttria-stabilized zirconia (YSZ) electrolyte, within an anode-supported solid oxide fuel cell (SOFC).
Figure 4:
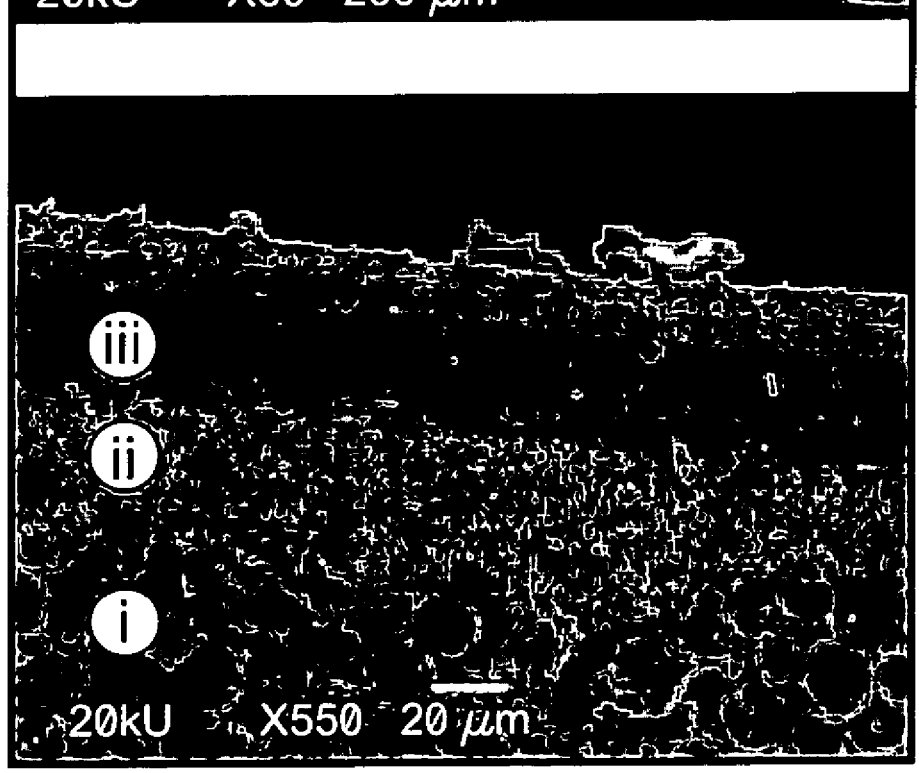

To introduce porosity into the anode interlayer, carbon black with a large particle size (75 nm) was employed. The resulting pore size was small enough to be partially sintered, so extra shrinkage was introduced in these green bodies. The sintering curve of the oxide host would remain unchanged only when the pore size generated by porogen was large enough not to be affected by the sintering process. The 20 wt % carbon black addition resulted in a fine porosity with acceptable X-Y shrinkage for the desired thin films. However, cracking was noted when it was applied to films of >50 μm-thick. FIG. 4 shows scanning electron micrograph (SEM) images of cross-sections of (i) a La—$CaTiO_3$ anode, (ii) a Sm—$CeO_2$/La—$CaTiO_3$ composite anode interlayer containing 35 vol % Sm—$CeO_2$, and (iii) a yttria-stabilized zirconia (YSZ) electrolyte, within an anode-supported (e.g., La—$CaTiO_3$-supported) solid oxide fuel cell (SOFC).

For cell testing, low levels of transition metal catalysts (e.g. copper, nickel and cobalt) were added to the electrochemical layer by impregnating the ceria powder with the respective nitrate precursor dissolved in methanol. While nickel could be added in high quantities, low loadings of cobalt and copper could be used without cell damage due to their volatility and melting, respectively, at the YSZ sintering temperature.

Figure 5:
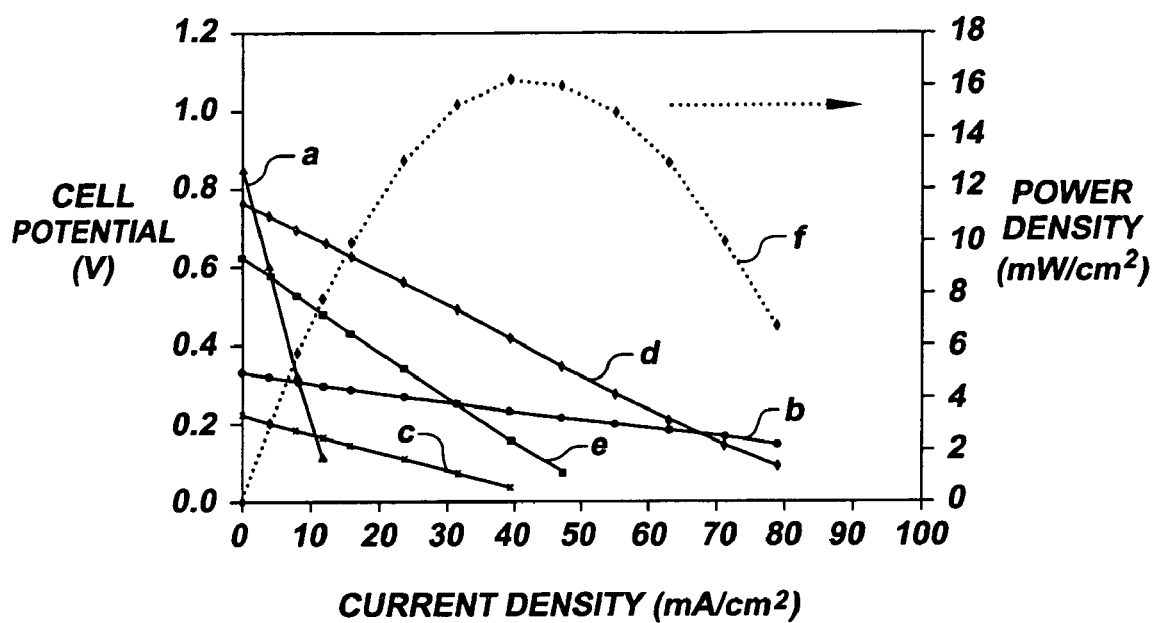
FIG. 5 shows cell potential as a function of current density at 900° C. for Sm—$CeO_2$/La—$CaTiO_3$ composite anode interlayer containing (a) 2.5 wt % Ni in humidified hydrogen, (b) 2.5 wt % Co in humidified hydrogen, (c) 2.5 wt % Cu in humidified hydrogen, and (d) 0.5 wt % Cu in humidified hydrogen, and (e) 0.5 wt % Cu in humidified methane, as well as (f) the power density of 0.5 wt % Cu in humidified hydrogen as a function of current density.

The electrochemical performance of these cells was investigated at 900° C. in humidified hydrogen, that is, hydrogen comprising steam. FIG. 5 shows cell potential as a function of current density at 900° C. for Sm—$CeO_2$/La—$CaTiO_3$ composite anode interlayer containing (a) 2.5 wt % Ni in humidified hydrogen, (b) 2.5 wt % Co in humidified hydrogen, (c) 2.5 wt % Cu in humidified hydrogen, and (d) 0.5 wt % Cu in humidified hydrogen, and (e) 0.5 wt % Cu in humidified methane, as well as (f) the power density of 0.5 wt % Cu in humidified hydrogen as a function of current density. The interlayer with nickel demonstrated the highest open-circuit potential. The interlayers containing copper and cobalt showed very low open-circuit potentials; the higher metal contents led to lower open-circuit potentials. The vaporization of cobalt or melting of copper oxides into the YSZ electrolyte during densification may have introduced some electronic conductivity. Overall, the power densities illustrated in FIG. 5 were quite low; the values obtained were essentially the same as that achieved over La—$SrTiO_3$ without ceria addition in an electrolyte-supported design.

Example 6

Experimental Design for Ni—Sn/YSZ

For the Ni—Sn/YSZ system, the following synthesis parameters were investigated: the mol % Sn in the intermetallic compound, the vol % intermetallic compound in the cermet, and the weight fraction of Unitec-10 coarse-grained YSZ vs. Tosoh fine-grained YSZ (see Table 3). The Sn content was limited to 40 mol %, above which the Ni—Sn intermetallics that could form might be liquid at the operating temperatures. Central composite designs were used to initially investigate the effects of the variables. The various samples were examined for shrinkage, porosity, % densification, grain coarsening, conductivity, oxidation resistance, and coke tolerance, amongst others. The anode materials that demonstrated sufficient stability in reaction with dry methane were subjected to electrochemical testing.

TABLE 3

| Range of parameters investigated in developing the Ni—Sn/YSZ cermet. | | | |
|---|---|---|---|
| | Mol % Sn | Vol % Ni—Sn | Wt % Coarse YSZ |
| Parameter Space | 0-40 | 40-70 | 0-100 |
| Optimal Parameter | 40 | 35-45 | 0-100 |

Example 7

Formation of Ni—Sn Intermetallics and Carbon Tolerance Thereof

A Ni—Sn cermet structure was used to produce a thick anode structure that exhibited substantially no volume change upon exposure to dry methane at 800° C. for 1.5 hours. Additionally, the use of a metal alloy or intermetallic compound such as Ni—Sn may prevent coke formation. A Ni—Sn system containing approximately 40 mol % Sn in Ni—Sn, present in approximately 40 vol % in the Ni—Sn/YSZ cermet, was investigated.

Figure 6:
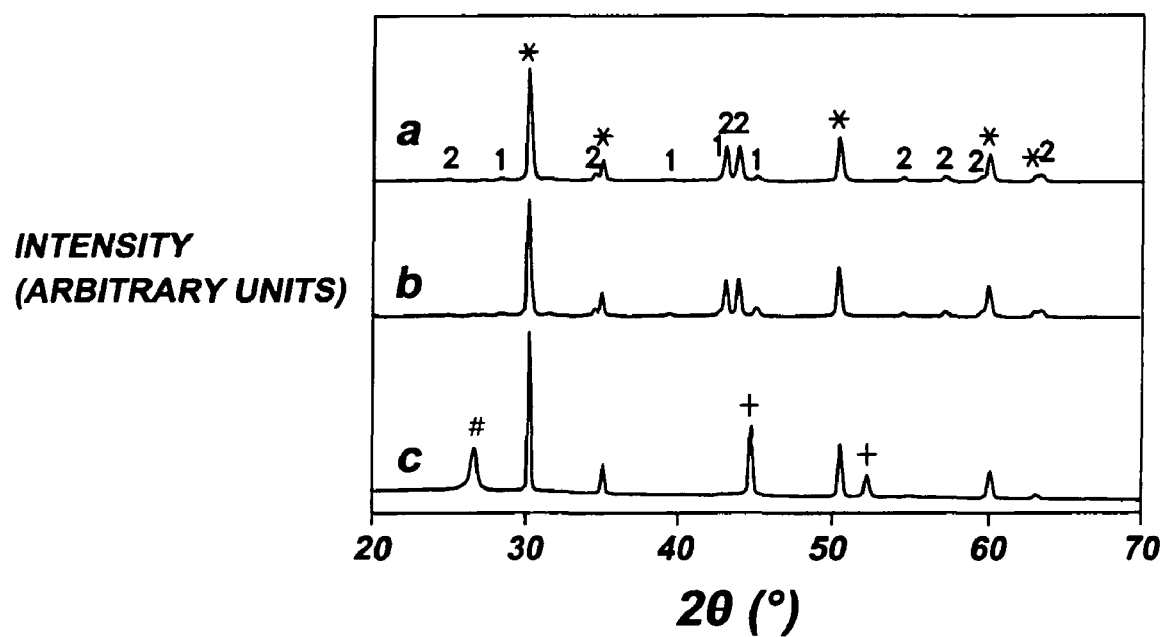
FIG. 6 shows XRD patterns for (a) Ni—Sn/YSZ cermet prepared by reduction of the oxide composite, and (b) Ni—Sn/YSZ cermet and (c) Ni/YSZ cermet after exposure to dry methane at 800° C. $Ni_3Sn_1$ (1), $Ni_3Sn_2$ (2), Ni (+), YSZ (*), and carbon (#) peaks are denoted.

FIG. 6 shows XRD patterns for (a) Ni—Sn/YSZ cermet prepared by reduction of the oxide composite, and (b) Ni—Sn/YSZ cermet and (c) Ni/YSZ cermet after exposure to dry methane at 800° C. $Ni_3Sn_1$ (1), $Ni_3Sn_2$ (2), Ni (+), YSZ (*), and carbon (#) peaks are denoted. As shown in FIG. 6, the desired Ni—Sn intermetallic compounds were successfully obtained by reducing a nickel-tin-zirconium oxide composite, even though the latter has been pelletized and subjected to significant grain growth and sintering at 1400° C. Only the XRD peaks for the intermetallic compounds were detected; no separate Ni or Sn diffraction peaks were noted. Unlike the Ni/YSZ cermet (FIG. 6C), substantially no graphitic crystalline carbon peak was observed at $2\theta=26°$ when the Ni—Sn/YSZ cermet was exposed to dry methane at 800° C. for 1.5 h (FIG. 6B). The prevention of crystalline carbon was noted and the as-reduced Ni—Sn/YSZ material (FIG. 6A) demonstrated substantially similar XRD patterns after the coking experiment.

Example 8

Structural Stability of the Anode to Dry Methane

Figure 7:
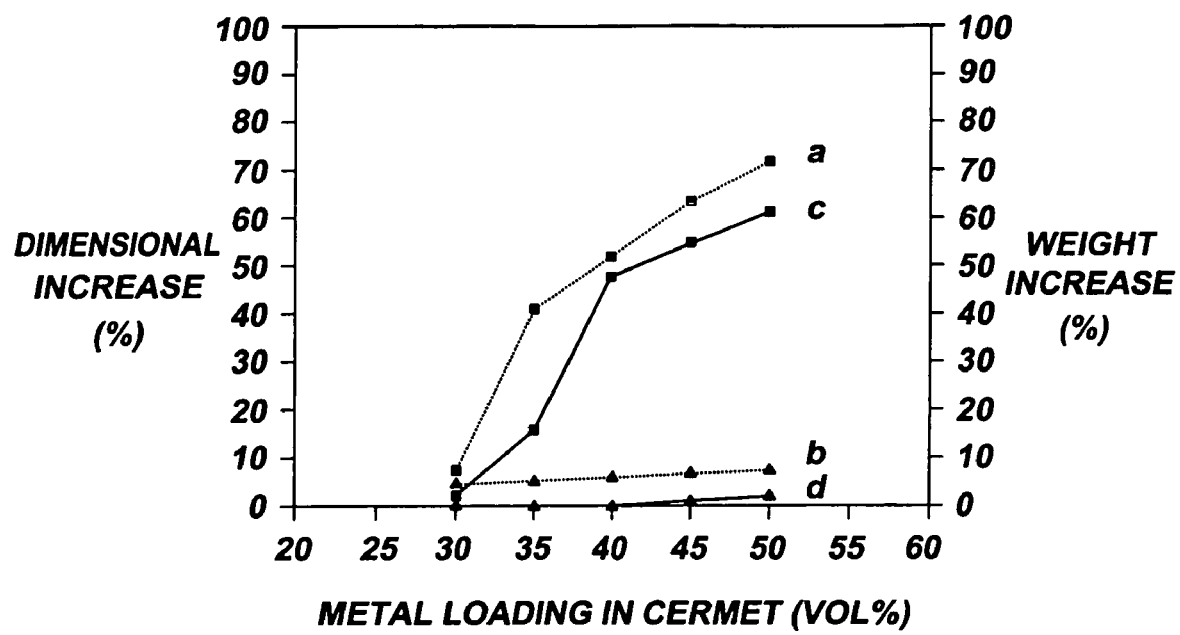
FIG. 7 shows the weight increase in (a) Ni/YSZ and (b) Ni—Sn/YSZ cermet anodes and the size increase in (c) Ni/YSZ and (d) Ni—Sn/YSZ cermet anodes after exposure to dry methane at 800° C. for 1.5 h.

Pelletized anode materials of numerous formulations were prepared and sintered to various temperatures, typically 1400° C., without electrolytes. These samples were then reduced and exposed to dry methane at 800° C. for 1.5 hours. The dimensional stabilities of Ni—Sn/YSZ (with 40 mol % Sn) and Ni/YSZ anodes materials were compared at various metal loadings. FIG. 7 shows the weight increase in (a) Ni/YSZ and (b) Ni—Sn/YSZ cermet anodes and the size increase in (c) Ni/YSZ and (d) Ni—Sn/YSZ cermet anodes after exposure to dry methane at 800° C. for 1.5 h. Increasing dimensional changes and weight gains were observed in the Ni/YSZ system with increasing metal loading. Although some coking took place over Ni—Sn/YSZ (as revealed by the weight gain), this system only experienced minor dimensional expansion above 40 vol % intermetallic compound loading. It appeared that the strength of the YSZ matrix was also an important variable in stabilizing the system against coking damage.

It is noted that some alternative metal anode cermets, such as those that employ copper, do so at metal loadings of only 14.4 vol % metal. Metal loadings below 30 vol % may lead to poor percolation in the cermet and low conductivity. Studies have indicated that the power density of some Cu/ceria system may triple after exposure to a carburizing environment, which may improve the metal connectivity in the cermet perhaps through carbon contact.

Figure 8:
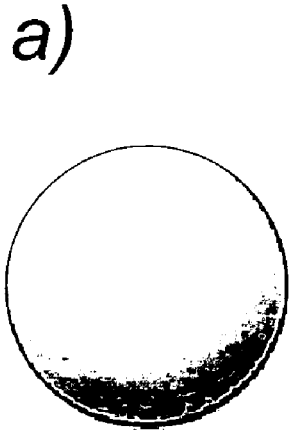
FIG. 8 shows optical micrographs of Ni—Sn/YSZ anode-supported YSZ electrolyte (a) before and (b) after exposure to dry methane at 800° C. for 1.5 h. Cells are 2 cm in diameter.
Figure 8:
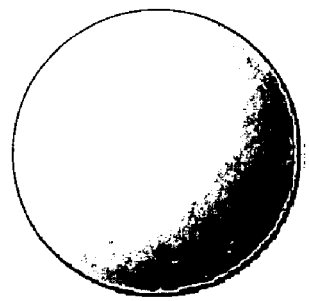

As such, anode-supported cells with electrolytes under 50 microns can be fabricated to survive a dry methane stream at 800° C. for 1.5 hours of exposure even with up to 40 vol % metal loadings. FIG. 8 shows optical micrographs of Ni—Sn/YSZ anode-supported YSZ electrolyte (a) before and (b) after exposure to dry methane at 800° C. for 1.5 h. The cells employed were 2 cm in diameter. The cell was fabricated with 40 mol % Sn in the intermetallic, 40 vol % Ni—Sn, and a mixture of YSZ fine and YSZ coarse powders in the ratio of 1:1.

Figure 9:
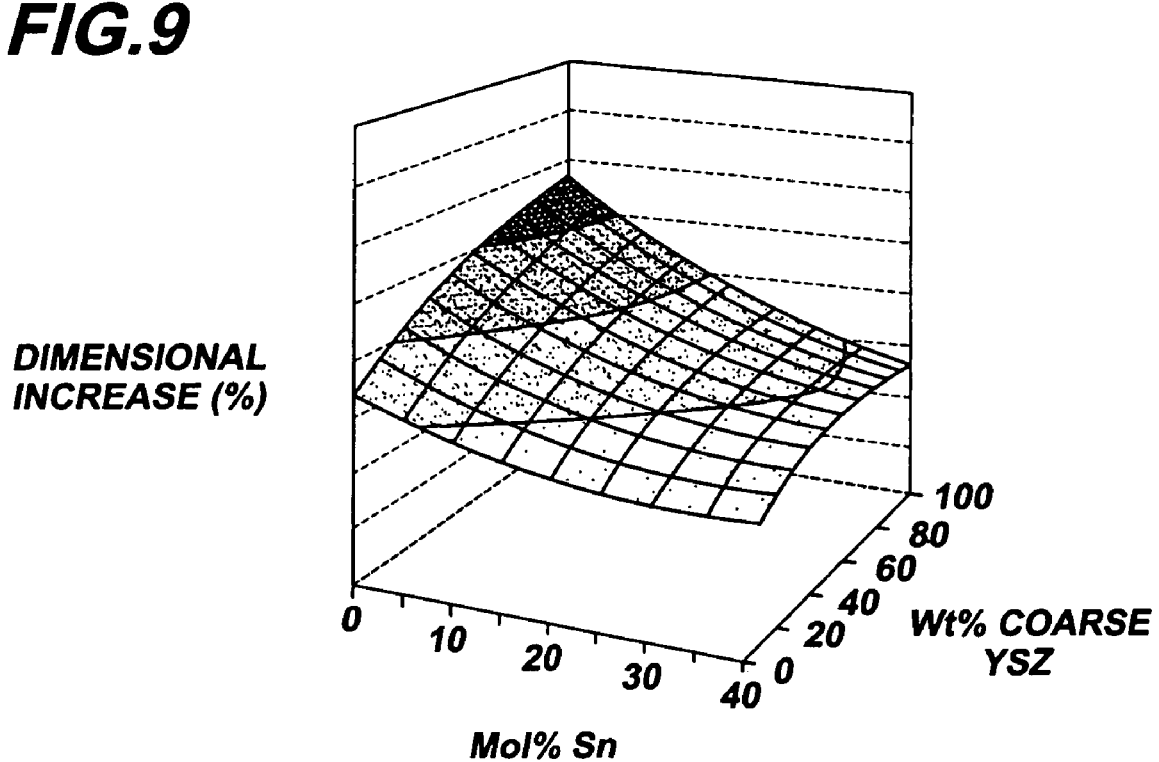
FIG. 9 shows a graph of the trends in dimensional stability as a function of mol % Sn in the Ni—Sn fraction and wt % coarse YSZ in the YSZ fraction at a constant Ni—Sn volume percent of 40% (remainder is YSZ).

To further illustrate the effect of the composition on dimensional stability, surface plots of the screening experiment across the parameter space listed in Example 6 (Table 3) are shown in FIG. 9. The surface plots were generated from a design of experiments model equation that represents a fit to the data of Rsq 0.84. As the fit is moderate to data of high reproducibility, only the trends are included for discussion. Absolute values of such effects, for example, are given in FIG. 7.

FIG. 9 shows a graph of the trends in dimensional stability as a function of mol % Sn in the Ni—Sn fraction and wt % coarse YSZ in the YSZ fraction at a constant Ni—Sn volume percent of 40% (remainder is YSZ). For clarity, 50 wt % coarse YSZ represents that half of the YSZ employed was Unitec-10. Similarly, 40 mol % Sn represents a target composition of $Ni_3Sn_2$. In this surface plot, the volume percent of the Ni—Sn was held at 40, which would mean that the YSZ fraction was 60 volume %. There are two main trends that are present. The largest trend relates to the effect of Sn to reduce the dimensional changes that occur upon the coking endurance test. Also illustrated is the effect of diminishing tolerance to coke as the fraction of YSZ coarse increases. The coarser YSZ leads to a reduced pellet strength and indicates that the YSZ matrix can contribute (though may not be required to do so) to increasing resistance to dimensional change during the endurance testing. This effect is less significant for systems with higher Sn mol %.

Without wishing to be bound by theory, it is believed that the relatively high levels of metal additive (e.g., tin) used in materials and methods of the present invention may provide substantial resistance to filamentous carbon formation, as well as resistance to mechanical damage that results in carburizing environments.

Example 9

Conductivity of the Intermetallic Cermet

Figure 10:
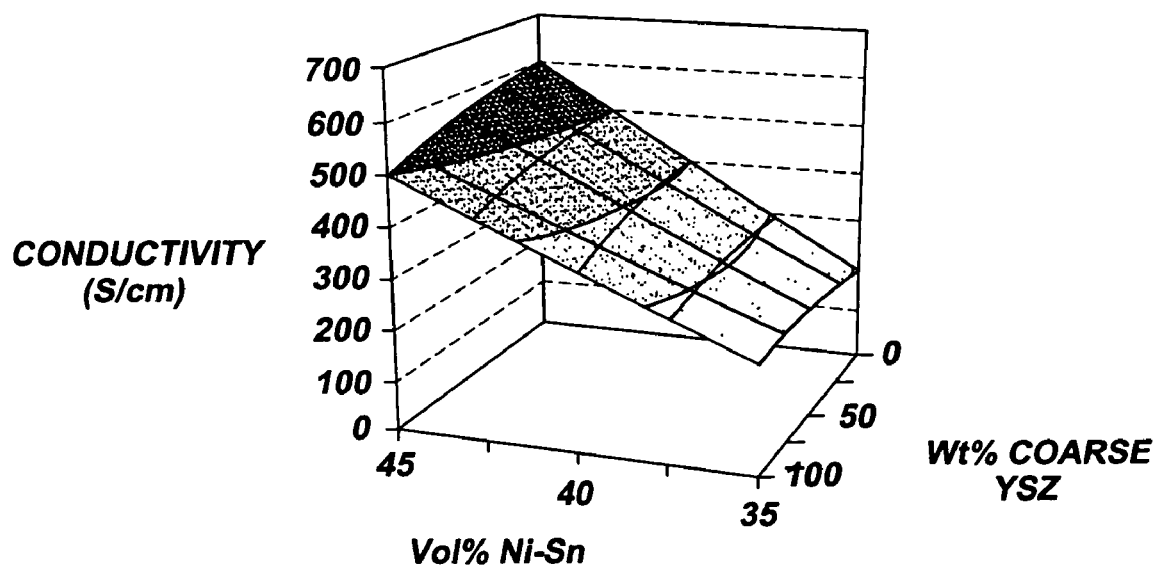
FIG. 10 shows a graph of the electrical conductivity of the Ni—Sn/YSZ cermet (with 40 mol % Sn) as a function of Ni—Sn loading in the cermet and the fraction of coarse-grained YSZ particles used.

Sintered and reduced anode materials were cut into bars and measured for electrical conductivity using a 4-pt method. FIG. 10 shows a graph of the electrical conductivity of the Ni—Sn/YSZ cermet (with 40 mol % Sn) as a function of Ni—Sn loading in the cermet and the fraction of coarse-grained YSZ particles used. As shown in FIG. 10, the electrical conductivities of the Ni—Sn/YSZ cermets were very high, especially compared to the ceramic systems initially explored (i.e. 400 S/cm at 40 vol % Ni—Sn). The effect of the YSZ particle size on initial conductivity was minor compared to the metal loading. Comparably fabricated Ni/YSZ had a conductivity of 1060 S/cm at 40 vol % Ni.

Example 10

Power Performance of a Ni—Sn/YSZ Anode-Supported Fuel Cell on Hydrogen

Figure 11:
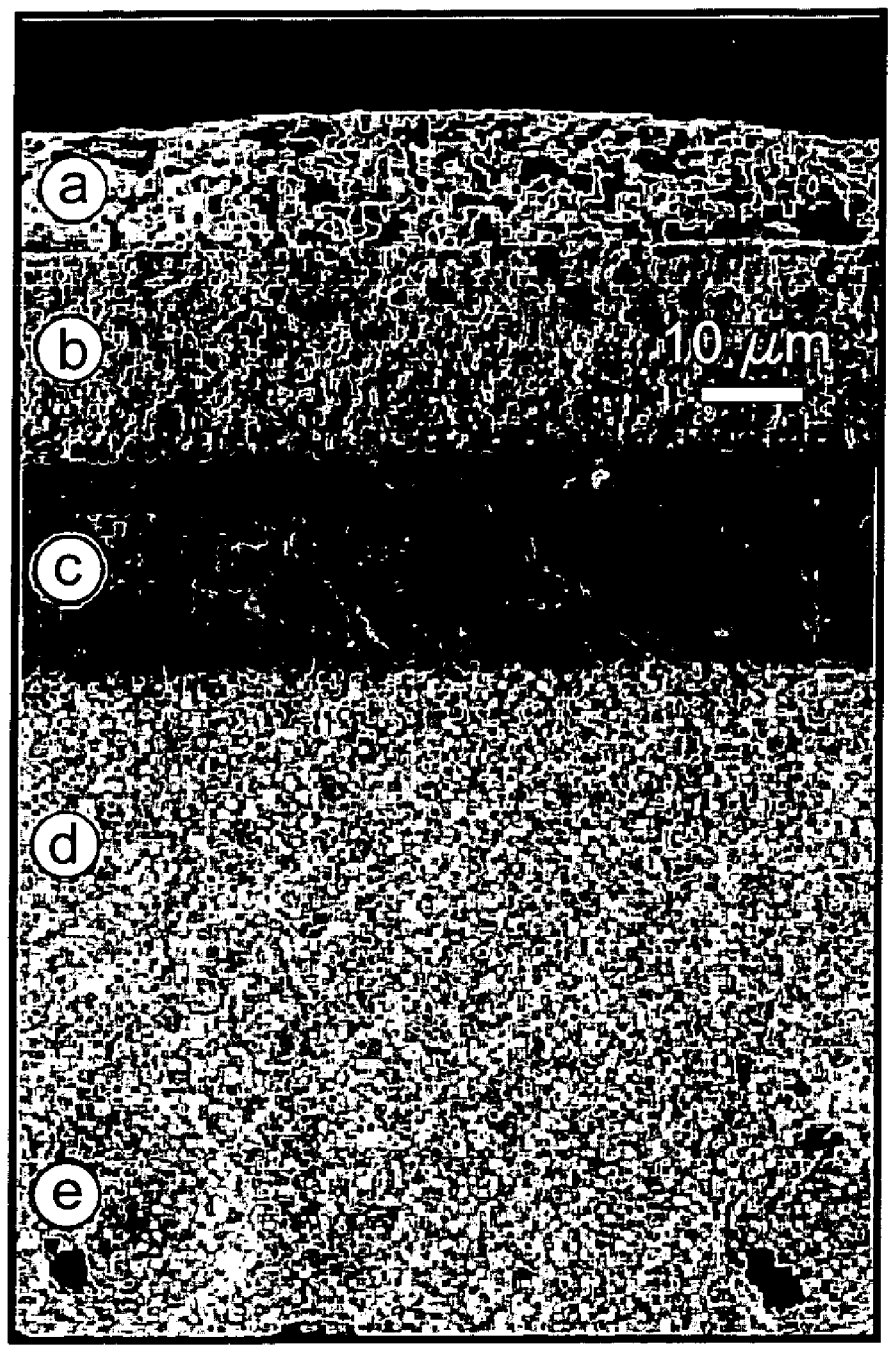
FIG. 11 shows SEM images of a cross-section of a reduced anode-supported SOFC with (a) Pt contact layer, (b) LSM/YSZ composite cathode, (c) YSZ electrolyte, (d) Ni—Sn/YSZ anode interlayer, and (e) Ni—Sn/YSZ anode support.
Figure 12:
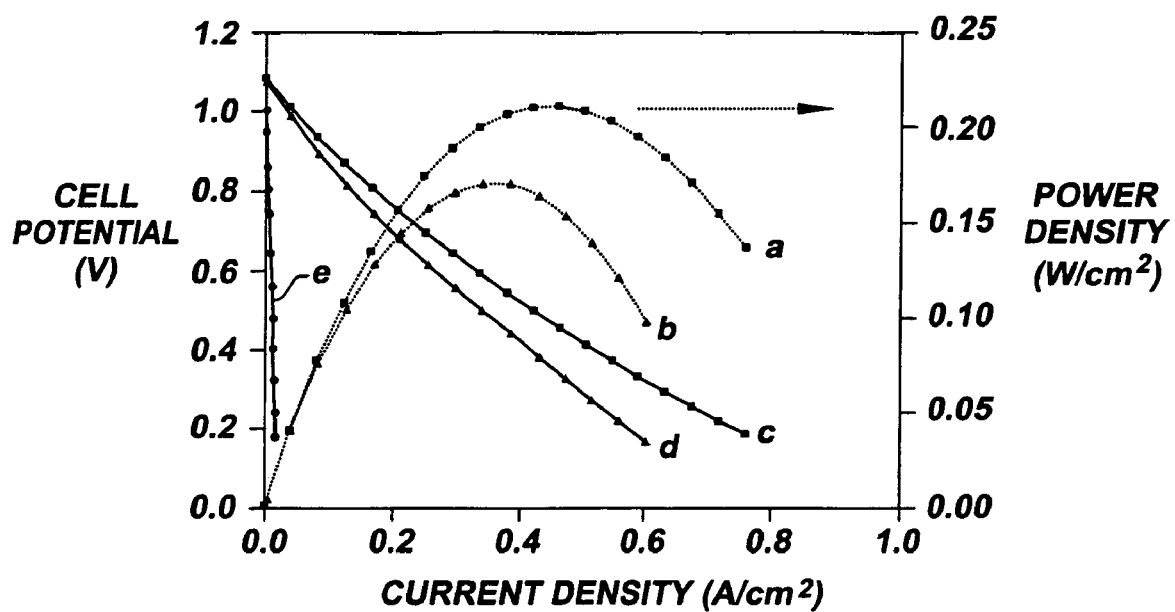
FIG. 12 shows the power density for Ni—Sn/YSZ anodes synthesized using (a) 50 wt % and (b) 0 wt % coarse-grained powders for YSZ, and the cell potential for Ni—Sn/YSZ anodes synthesized using (c) 0 wt %, (d) 50 wt % and (e) 100 wt % coarse-grained powders for YSZ, in humidified hydrogen at 800° C.

A SOFC was fabricated with the Ni—Sn/YSZ anode system. FIG. 11 shows SEM images of a cross-section of a reduced anode-supported SOFC (1 mm-thick) with (a) Pt contact layer, (b) LSM/YSZ composite cathode, (c) YSZ electrolyte, (d) Ni—Sn/YSZ anode interlayer, and (e) Ni—Sn/YSZ anode support with 40 mol % Sn and 40 vol % Ni—Sn loading in the cermet. In the tests described herein, the anode interlayer and anode support layer are comparably formulated, except that the support included additional porogens such as glassy carbon. The electrochemical activity was examined for three different powder mixtures for YSZ, in humidified hydrogen at 800° C. with 40 mol % Sn and 40 vol % Ni—Sn loading in the cermet. The effect of YSZ particle size on the anode performance was investigated with 0, 50 and 100 wt % coarse-grained powders (Unitec-10). FIG. 12 shows the power density for Ni—Sn/YSZ anodes synthesized using (a) 50 wt % and (b) 0 wt % coarse-grained powders for YSZ, and the cell potential for Ni—Sn/YSZ anodes synthesized using (c) 0 wt %, (d) 50 wt % and (e) 100 wt % coarse-grained powders for YSZ, in humidified hydrogen at 800° C. As shown in FIG. 12, a 1:1 mixture of coarse-grained and fine-grained YSZ particles led to the best cell potential and power density. The anode prepared with all coarse-grained YSZ particles demonstrated reduced power. The use of fine YSZ particles might improve the microstructure resulting from reduction and transition to the observed intermetallic compounds. Without wishing to be bound by theory, the superior performance of the anode with a 1:1 mixture of coarse-grained and fine-grained YSZ, compared to that with 100 wt % fine-grained YSZ, may be due to a moderate enhancement in anode porosity.

Figure 13A:
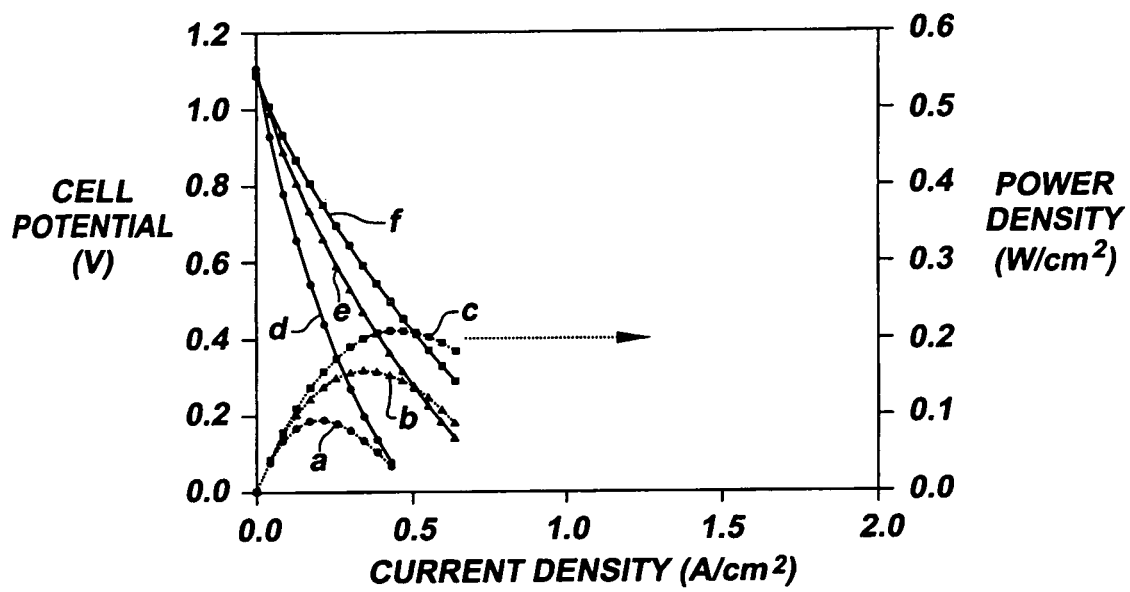
FIG. 13A shows the power density for Ni—Sn/YSZ anodes in humidified hydrogen at (a) 700° C., (b) 750° C. and (c) 800° C., and the cell potential for Ni—Sn/YSZ anodes in humidified hydrogen at (d) 700° C., (e) 750° C. and (f) 800° C.
Figure 13B:
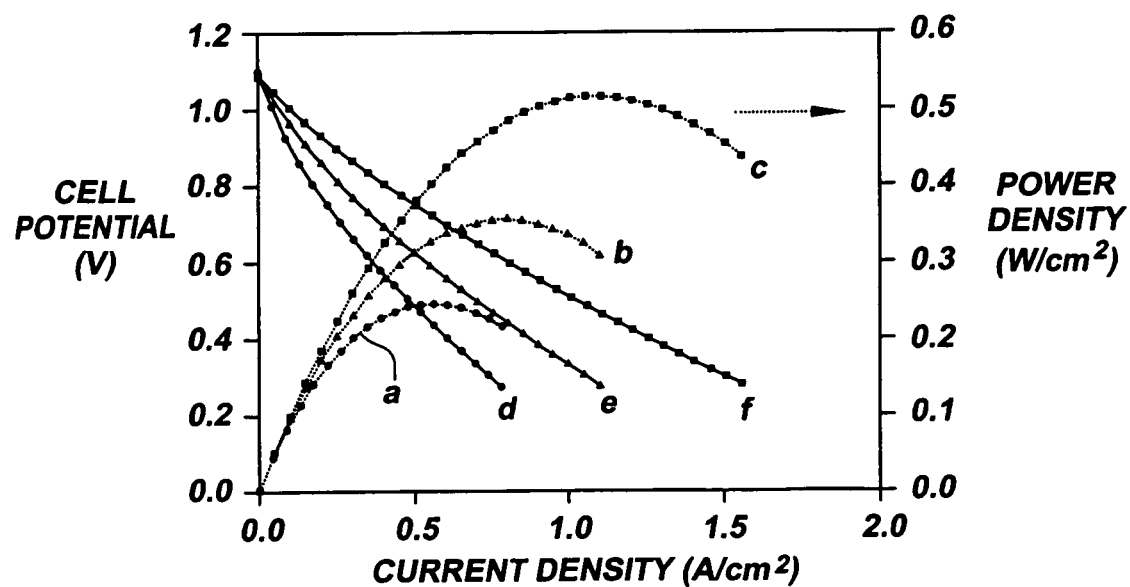
FIG. 13B shows the power density for Ni/YSZ anodes in humidified hydrogen at (a) 700° C., (b) 750° C. and (c) 800° C., and the cell potential for Ni—Sn/YSZ anodes in humidified hydrogen at (d) 700° C., (e) 750° C. and (f) 800° C.

Next, the power performance of the optimized Ni—Sn/YSZ was compared to a comparably prepared and tested Ni/YSZ system. When the system was reduced at too high a temperature or hydrogen concentration, the system would perform poorly, similar to the 100% coarse-grained YSZ cermets. Optimal reduction involved the use of a humidified 5% hydrogen feed at the operating temperature of 800° C. FIG. 13A shows the power density for Ni—Sn/YSZ anodes in humidified hydrogen at (a) 700° C., (b) 750° C. and (c) 800° C., and the cell potential for Ni—Sn/YSZ anodes in humidified hydrogen at (d) 700° C., (e) 750° C. and (f) 800° C. FIG. 13B shows the power density for Ni/YSZ anodes in humidified hydrogen at (a) 700° C., (b) 750° C. and (c) 800° C., and the cell potential for Ni—Sn/YSZ anodes in humidified hydrogen at (d) 700° C., (e) 750° C. and (f) 800° C. The power density observed by the Ni—Sn/YSZ anode at 800° C. in humidified hydrogen was 210 mW/cm$^2$ (FIG. 13A). In comparison, a Ni/YSZ anode was able to produce a maximum power density of 520 mW/cm$^2$ (FIG. 13B).

Example 11

Power Performance of a Ni—Sn/YSZ Anode-supported Fuel Cell on Methane

Figure 14:
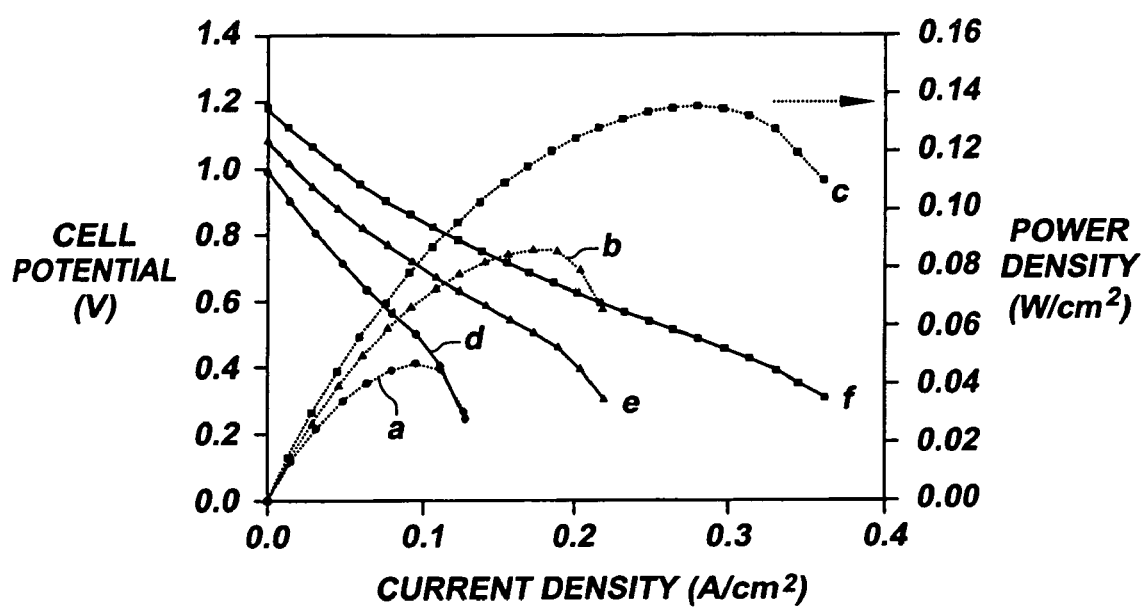
FIG. 14 shows the power density for Ni—Sn/YSZ anode-supported cell in humidified methane at (a) 700° C., (b) 750° C. and (c) 800° C., and the cell potential for Ni—Sn/YSZ anode-supported cell in humidified methane at (d) 700° C., (e) 750° C. and (f) 800° C.

A Ni—Sn/YSZ anode-supported cell was prepared with 40 mol % Sn and 40 vol % Ni—Sn loading in the cermet utilizing a 50/50 mixture of fine/coarse YSZ. FIG. 14 shows the power density for Ni—Sn/YSZ anode-supported cell in humidified methane at (a) 700° C., (b) 750° C. and (c) 800° C., and the cell potential for Ni—Sn/YSZ anode-supported cell in humidified methane at (d) 700° C., (e) 750° C. and (f) 800° C. The power density achieved by the Ni—Sn/YSZ anode in humidified methane was 140 mW/cm$^2$ at 800° C.

Example 12

Formation Temperature of the Ni—Sn Intermetallic

Figure 15:
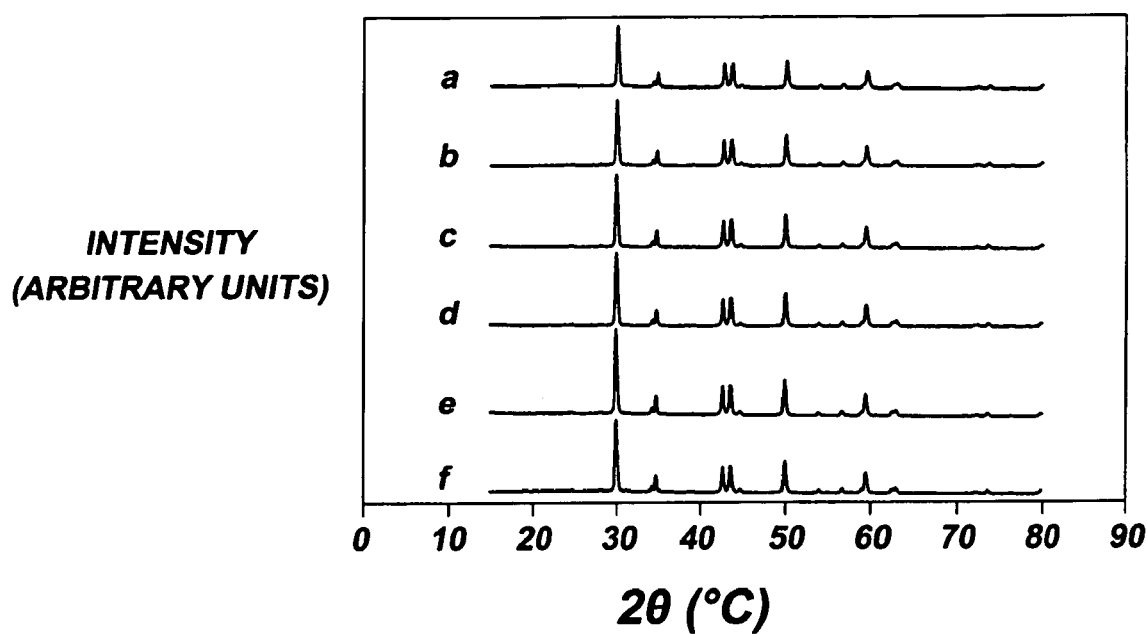
FIG. 15 shows XRD patterns for Ni—Sn/YSZ with 40 mol % Sn in the Ni—Sn fraction with a 40 vol % Ni—Sn in the cermet prepared by reduction of the oxide composite at (a) 950° C., (b) 900° C., (c) 850° C., (d) 800° C., (e) 750° C., (f) 700° C.

Various electrode pellets were formed and sintered at 1400° C. prepared with 40 mol % Sn and 40 vol % Ni—Sn loading in the cermet. The reduction temperature necessary to form the intermetallic was then investigated by reducing the composite oxide structure at various temperatures in 10% hydrogen gas. The XRD spectra in FIG. 15 demonstrate that the Ni—Sn intermetallic compounds formed at all temperatures investigated.

Example 13

Re-Oxidation of Ni—Sn/YSZ Anode

Figure 31:
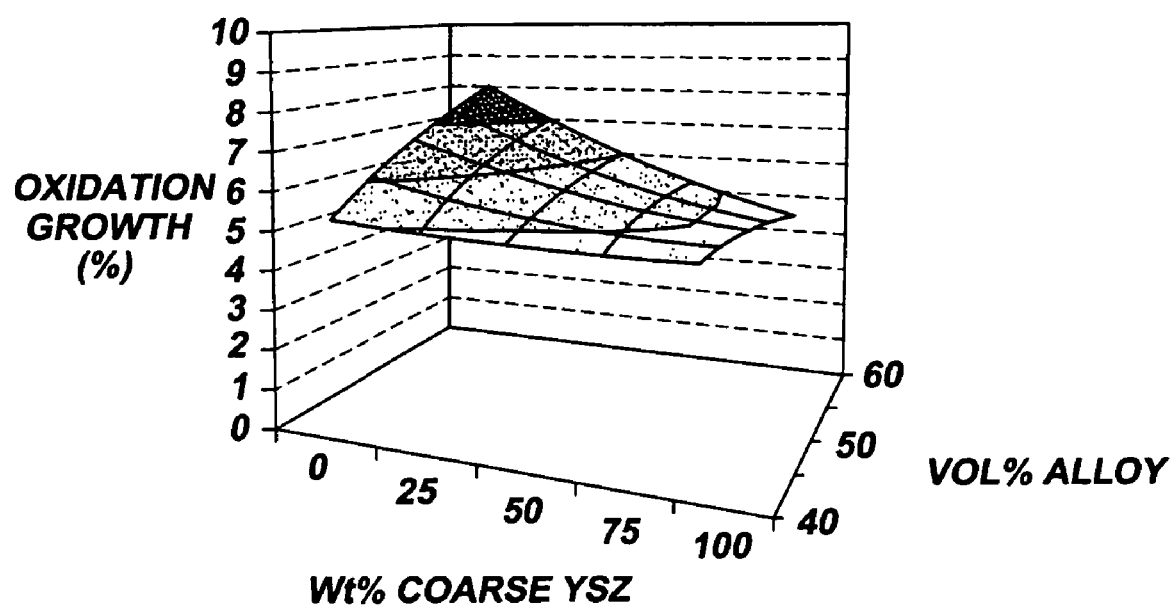
FIG. 31 shows growth from rapid oxidation of reduced Ni—Sn/YSZ cermets (with 40 mol % Sn) at 800° C. as a function of the alloy loading in the cermet and the wt % of coarse-grained YSZ particles used.

The ability of the Ni—Sn/YSZ anode to be reoxidized was examined. After complete reduction in 5% hydrogen at 900° C., the anode systems were reoxidized in air at 800° C. The increase in dimension associated with reoxidation was examined as a function of the alloy loading in the cermet and the wt % of coarse-grained YSZ particles used. FIG. 31 shows growth from rapid oxidation of reduced Ni—Sn/YSZ cermets (with 40 mol % Sn) at 800° C. as a function of the alloy loading in the cermet and the wt % of coarse-grained YSZ particles used. As expected, like other cermet anodes, the Ni—Sn/YSZ system could not be reoxidized once it has been reduced. The most significant improvement in cell stability resulted from the use of coarse YSZ particles. However, those of ordinary skill in the art, with the benefit of this disclosure, would be able to develop a cermet-based anode with improved shutdown characteristics in non-inert atmospheres (e.g., by modifying the compositions of the metal components of the cermet as described herein).

Example 14

Protocol of Testing Catalytic Activity and Stability of Intermetallics Compounds in Carbon-Prone Fuel Mixtures To examine the catalytic ability of the intermetallic compounds in carbon-prone reaction mixtures, dry reforming was selected as a target reaction. The reaction mixture comprised of 45.5% methane, 45.5% carbon dioxide, and 9.1% nitrogen. The nitrogen was employed in the reaction mixture to enable accurate determination of the mass balances. The space velocity was 22,000 sccm/(g hr) and the reactions were performed at 900° C. unless otherwise noted.

The catalysts were synthesized by methods similar to those employed in the preparation of electrode materials. Namely, a catalyst pellet of sufficient strength to prevent mechanical failure of the material in an actual reactor system was produced. Thus, a mixture of precursor oxides were prepared with a PVB binder and pressed into pellets. The pellets were then fired to 1400° C. to produce a pellet of substantial strength. This pellet was then pulverized in a Spex 8000 mill with zirconia jar and media to produce a fine powder for catalytic characterization. The apparent catalyst density in non-reduced powder form was 0.345 g/ml. Those of ordinary skill in the art would be able to select other suitable methods for pellet synthesis without undue experimentation.

A packed bed reactor was constructed. Complete computer control allowed the reactant gas mixture to be altered with precise timing. For example, subsequent experiments focused on employing variable methane/carbon dioxide ratios at set timings to exacerbate the coking potential. The reactor pressure was monitored through a pressure transducer that would terminate the run if the pressure drop through the bed approached the bursting pressure of the sealing unions to the ¼" fused silica reactor tube. Gas flow rates were controlled with MKS mass flow controllers. The reactor effluent was analyzed using an Agilent 6890 gas chromatograph. Reaction temperature was controlled with a thermocouple inserted just below the catalyst bed. The catalyst powder was loaded between quartz wool plugs.

Example 15

Coke Test of a Catalyst Composition at 900° C.

In preparation for catalytic testing, a coking endurance test was performed similar to those of Example 7, but at 900° C., to test the material resistance to carburizing environments at higher temperatures. The gas environment consisted of only methane. Shown in FIG. 16 is the result of this test for a catalyst comprised of 40 vol % Ni—Sn/YSZ cermet utilizing 40 mol % Sn as well as for a comparably prepared Ni/YSZ cermet.

Figure 16:
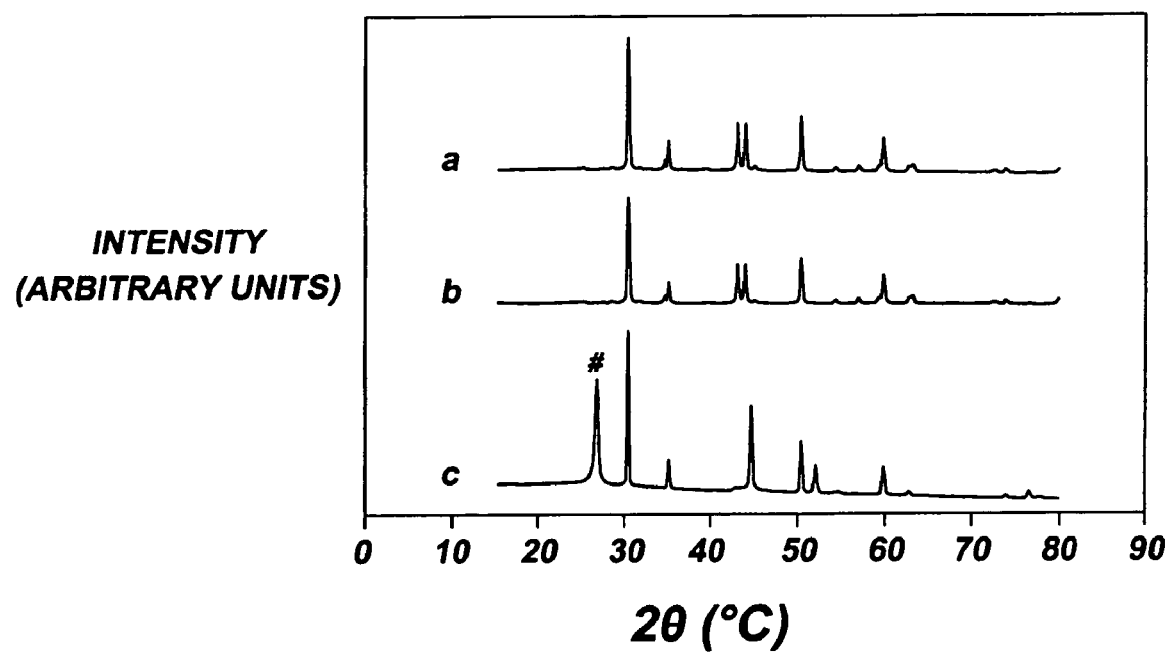
FIG. 16 shows XRD patterns for (a) Ni—Sn/YSZ cermet prepared by reduction of the oxide composite, and (b) Ni—Sn/YSZ cermet and (c) Ni/YSZ cermet after exposure to dry methane at 900° C. for 1 h. Carbon (#) peaks are denoted.

FIG. 16 shows XRD patterns for (a) Ni—Sn/YSZ cermet prepared by reduction of the oxide composite, and (b) Ni—Sn/YSZ cermet and (c) Ni/YSZ cermet after exposure to dry methane at 900° C. for 1 h. Carbon (#) peaks are denoted. The XRD patterns after reduction and after coking for the intermetallic system are identical demonstrating the effectiveness of such materials at reducing crystalline carbon deposition (FIGS. 16A-B). A comparably prepared Ni/YSZ sample demonstrated even stronger crystalline peak that that produced at 800° C. (FIG. 16C). After the reaction runs over such catalyst materials that lasted for 100 hours at 900° C. as described in the examples disclosed herein, substantially no crystalline carbon was detected in XRD except for over runs that employed the Ni/YSZ catalyst.

Example 16

Conversion and Stability of Stoichiometric Dry Reforming Over Ni/YSZ Catalyst

A Ni/YSZ pellet was synthesized, sintered, and pulverized as described in Example 14. The catalyst comprised 40 vol % nickel metal and was loaded into the reactor and tested for activity towards carbon dioxide reforming of methane with a methane to carbon dioxide ratio of 1. The reaction program was to run for 100 hours at 900° C., but severe coking lead to an unacceptable pressure drop and the reaction was terminated by the computer in under 14 hours of operation. XRD analysis of the spent catalyst indicated the presence of crystalline carbon. The carbon balance was missing on average 5.845% of its carbon with a standard deviation of 0.41. The carbon monoxide selectivity (the percent created over the sum conversion of methane and carbon dioxide) was only 93.99% with a standard deviation of 0.42. This catalyst was unable to sustain the carburizing environment of stoichiometric dry reforming at 900° C.

Example 17

Conversion and Stability of Stoichiometric Dry Reforming Over Ni—Sn/YSZ

A catalyst pellet was synthesized, sintered, and pulverized as described in Example 14 that comprised 40 vol % Ni—Sn/YSZ cermet utilizing 40 mol % Sn. It was loaded into the reactor and tested towards carbon dioxide reforming of methane with a methane to carbon dioxide ratio of 1. The catalyst was in the reaction environment at 900° C. for 100 hours. The carbon balance was missing on average 0.11% of its carbon with a standard deviation of 0.42. The carbon monoxide selectivity (the percent created over the sum conversion of methane and carbon dioxide) was 99.63% with a standard deviation of 1.43. The CO/$H_2$ ratio was on average 1.72 with a standard deviation of 0.057 indicating water gas shift activity was present. By mathematically removing the water observed via the reverse water gas shift stoichiometry, one calculates a CO/$H_2$ of 0.99 with a standard deviation of 0.036.

Figure 17:
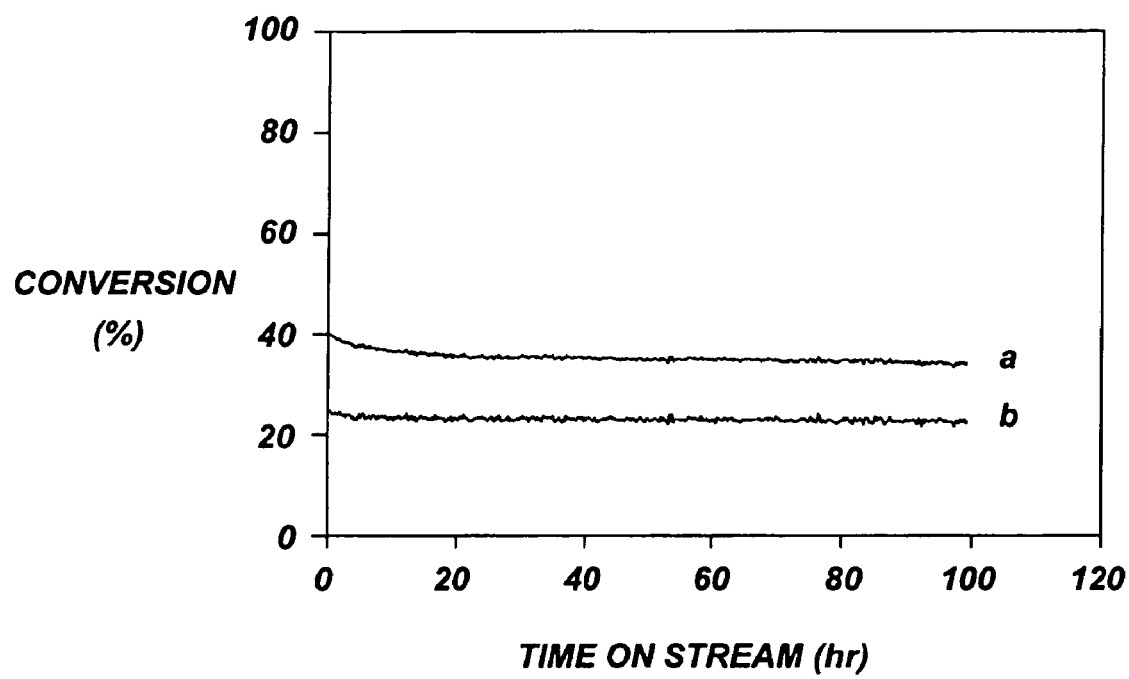
FIG. 17 shows (a) carbon dioxide conversion and (b) methane conversion at 900° C. for the dry reforming of methane. The reaction was conducted at a space velocity of 22,000 sccm/(g hr) with a methane to carbon dioxide ratio of 1 in the feed.
Figure 18:
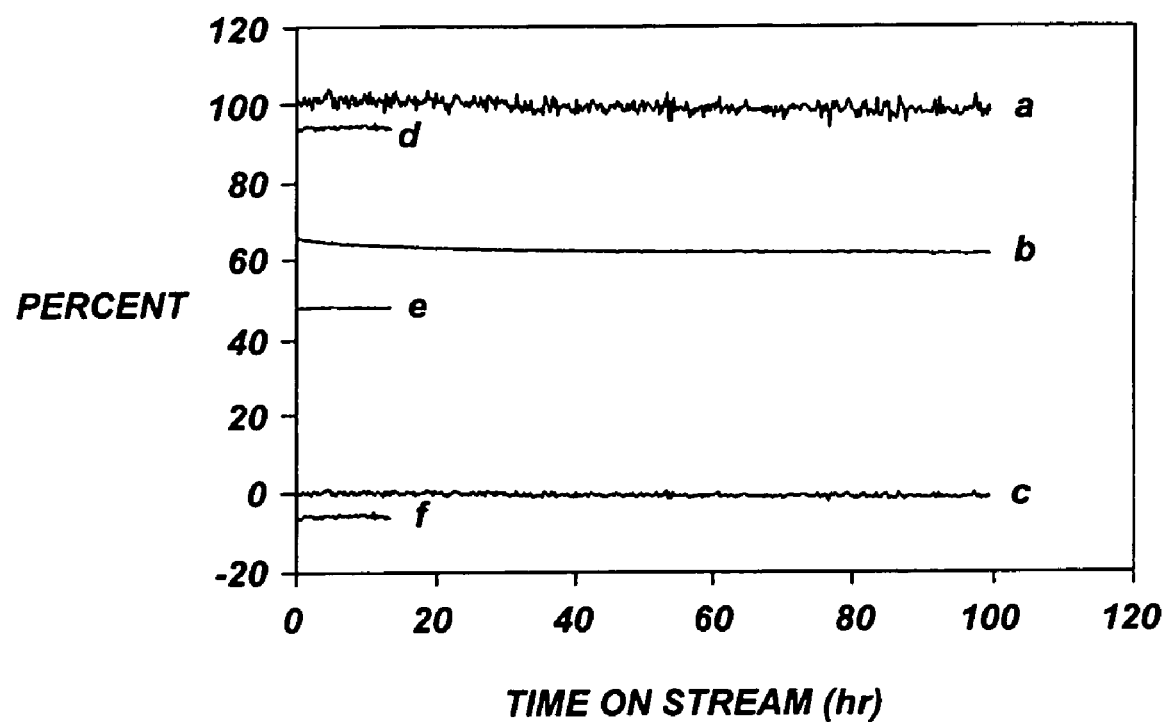
FIG. 18 shows the (a) carbon monoxide selectivity, (b) percent CO in the CO and $H_2$ product distribution, and (c) percent error in the carbon balance for a Ni—Sn/YSZ catalyst with a 40 mol % Sn in the Ni—Sn fraction, and the (d) carbon monoxide selectivity, (e) percent CO in the CO and $H_2$ product distribution, and (f) percent error in the carbon balance for a Ni/YSZ catalyst in the dry reforming of methane with a methane to carbon dioxide ratio of 1 in the feed.

FIG. 17 shows (a) carbon dioxide conversion and (b) methane conversion at 900° C. for the dry reforming of methane. The reaction was conducted at a space velocity of 22,000 sccm/(g hr) with a methane to carbon dioxide ratio of 1 in the feed. FIG. 18 shows the (a) carbon monoxide selectivity, (b) percent CO in the CO and $H_2$ product distribution, and (c) percent error in the carbon balance for a Ni—Sn/YSZ catalyst with a 40 mol % Sn in the Ni—Sn fraction, and the (d) carbon monoxide selectivity, (e) percent CO in the CO and $H_2$ product distribution, and (f) percent error in the carbon balance for a Ni/YSZ catalyst of Example 16 in the dry reforming of methane with a methane to carbon dioxide ratio of 1 in the feed. Both catalysts had a 60 vol % YSZ fraction. The methane to carbon dioxide ratio was constant and set at 1.

The carbon balance error of the catalyst examples as shown in the figures can be calculated using the following formula,

[-(carbon input−carbon output)/(carbon input)]×100=% carbon balance error.

Figure 19:
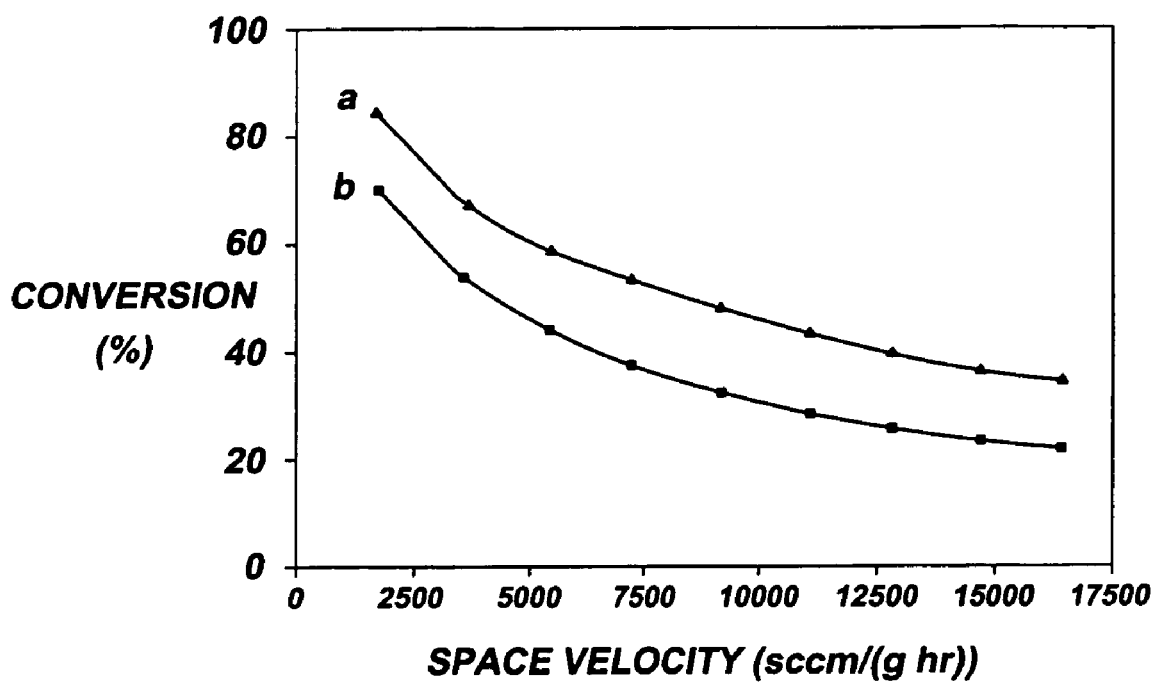
FIG. 19 shows (a) carbon dioxide conversion and (b) methane conversion at 900° C. for the dry reforming of methane. The reaction was conducted at variable space velocities with a methane to carbon dioxide ratio of 1 in the feed.

FIG. 19 shows (a) carbon dioxide conversion and (b) methane conversion at 900° C. for the dry reforming of methane as a function of space velocity at 900° C. over such a catalyst. The reaction was conducted at variable space velocities with a methane to carbon dioxide ratio of 1 in the feed.

Example 18

Intermetallic Catalyst Stability to Variable $CH_4/CO_2$ Streams Ranging from 0.6/0.4 to 0.4/0.6

A catalyst pellet was synthesized, sintered, and pulverized as described above that comprised of 40 vol % Ni—Sn/YSZ cermet utilizing 40 mol % Sn. The catalyst pellet was loaded into the reactor and tested towards carbon dioxide reforming of methane with a variable methane to carbon dioxide ratio at 900° C. For the first 10 hours, the catalyst was exposed to a methane to carbon dioxide ratio of 1 (A). For the next 100 hours in increments of 10 hours, the reaction mixture was cycled from a methane to carbon dioxide ratio of 0.6/0.4 (B) to 0.4/0.6 (C), starting with methane rich conditions. Using the nomenclature of this example, the gas environment was thus ABCBCBCBCB where each letter represented the state of the flow for 10 hours.

The carbon balance gained on average 0.17% of its carbon with a standard deviation of 0.41. The carbon monoxide selectivity (the percent created over the sum conversion of methane and carbon dioxide) was 100.74% with a standard deviation of 1.76. The CO/$H_2$ ratio was on average 1.91 with a standard deviation of 0.59 indicating significant changes did occur with gas cycling. By mathematically removing the water observed via the reverse water gas shift stoichiometry, one calculates a CO/$H_2$ of 1.02 with a standard deviation of 0.045 again demonstrating water gas shift activity.

Figure 20:
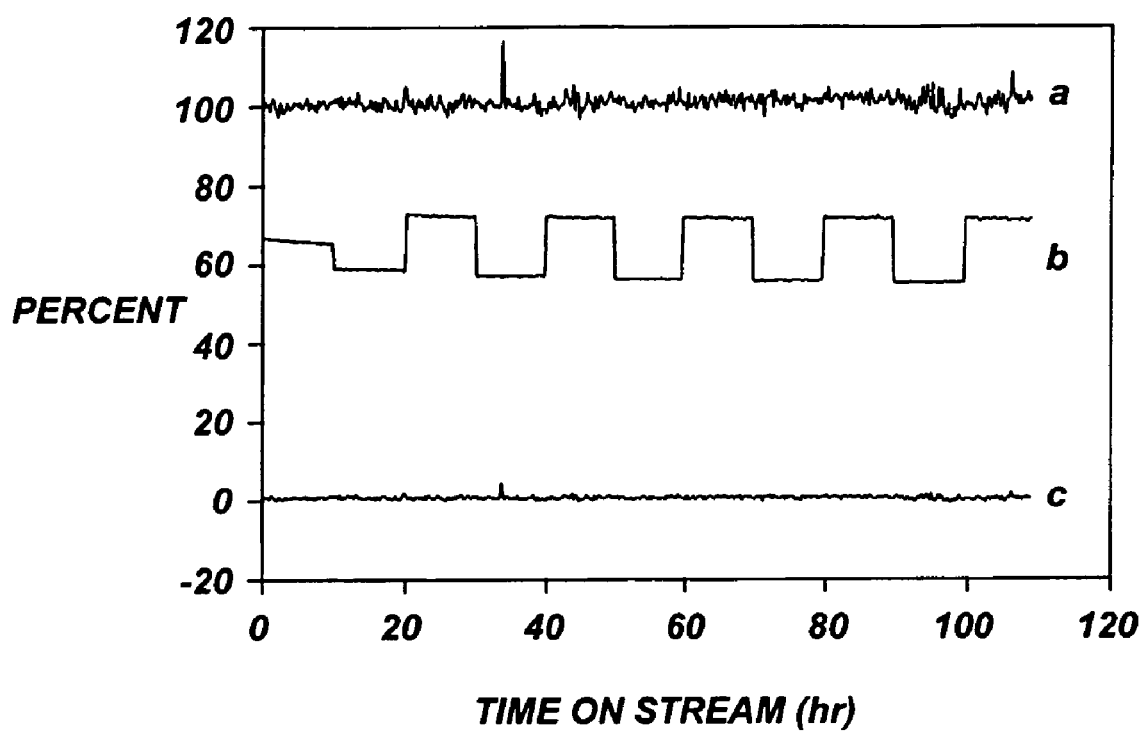
FIG. 20 shows (a) the carbon monoxide selectivity, (b) percent CO in the CO and $H_2$ product distribution, and (c) percent error in the carbon balance for a Ni—Sn/YSZ catalyst with a 40 mol % Sn in the Ni—Sn fraction with a 60 vol % YSZ fraction, upon exposure to a $CH_4$/$CO_2$ stream with a systematically varied methane to carbon dioxide ratio between 0.667 to 1.5 in the feed.

FIG. 20 shows (a) the carbon monoxide selectivity, (b) percent CO in the CO and $H_2$ product distribution, and (c) percent error in the carbon balance for a Ni—Sn/YSZ catalyst with a 40 mol % Sn in the Ni—Sn fraction with a 60 vol % YSZ fraction, upon exposure to a $CH_4/CO_2$ stream with a systematically varied methane to carbon dioxide ratio between 0.667 to 1.5 in the feed. The methane to carbon dioxide ratio was variable in a pattern ABCBCBCBCB, where A was 1, B was 1.5, and C was 0.667. Each segment represents 10 hours.

Example 19

Intermetallic Catalyst Stability to Variable $CH_4/CO_2$ Streams Ranging from 0.7/0.3 to 0.3/0.7

A catalyst pellet was synthesized, sintered, and pulverized as described above that comprised of 40 vol % Ni—Sn/YSZ cermet utilizing 40 mol % Sn. The catalyst was loaded into the reactor and tested towards carbon dioxide reforming of methane with a variable methane to carbon dioxide ratio at 900° C. For the first 10 hours, the catalyst was exposed to a methane to carbon dioxide ratio of 1 (A). For the next 100 hours in increments of 10 hours, the reaction mixture was cycled from a methane to carbon dioxide ratio of 0.7/0.3 (B) to 0.3/0.7 (C), starting with methane rich conditions. Using the nomenclature of this example, the gas environment was thus ABCBCBCBCB where each letter represented the state of the flow for 10 hours.

The carbon balance gained on average 0.25% of its carbon with a standard deviation of 0.43. The carbon monoxide selectivity (the percent created over the sum conversion of methane and carbon dioxide) was 101.15% with a standard deviation of 1.92. The CO/$H_2$ ratio was on average 2.64 with a standard deviation of 1.67 indicating significant changes did occur with gas cycling. By mathematically removing the water observed via the reverse water gas shift stoichiometry, one calculates a CO/$H_2$ of 1.03 with a standard deviation of 0.054 again demonstrating water gas shift activity.

Figure 21:
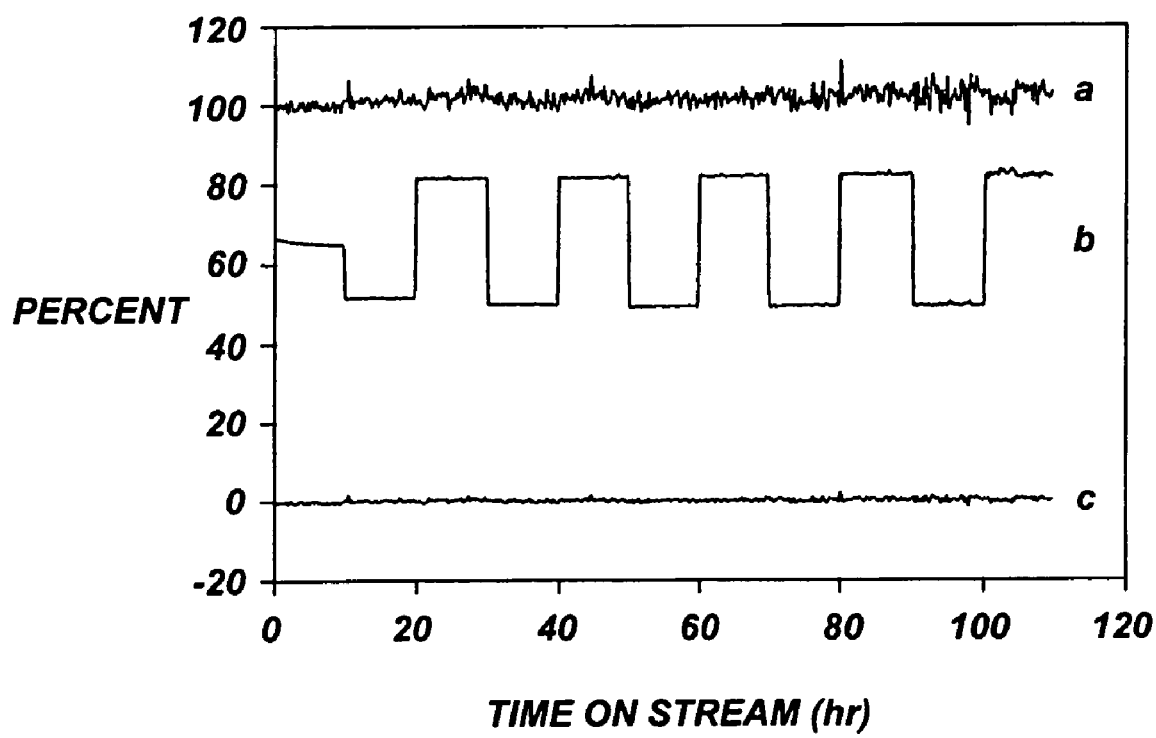
FIG. 21 shows (a) the carbon monoxide selectivity, (b) percent CO in the CO and $H_2$ product distribution, and (c) percent error in the carbon balance for a Ni—Sn/YSZ catalyst with a 40 mol % Sn in the Ni—Sn fraction with a 60 vol % YSZ fraction, upon exposure to a $CH_4$/$CO_2$ stream with a systematically varied methane to carbon dioxide ratio between 0.429 to 2.33 in the feed.

FIG. 21 shows (a) the carbon monoxide selectivity, (b) percent CO in the CO and $H_2$ product distribution, and (c) percent error in the carbon balance for a Ni—Sn/YSZ catalyst with a 40 mol % Sn in the Ni—Sn fraction with a 60 vol % YSZ fraction, upon exposure to a $CH_4/CO_2$ stream with a systematically varied methane to carbon dioxide ratio between 0.429 to 2.33 in the feed. The methane to carbon dioxide ratio was variable in a pattern ABCBCBCBCB, where A was 1, B was 2.33, and C was 0.429. Each segment represents 10 hours.

Figure 22:
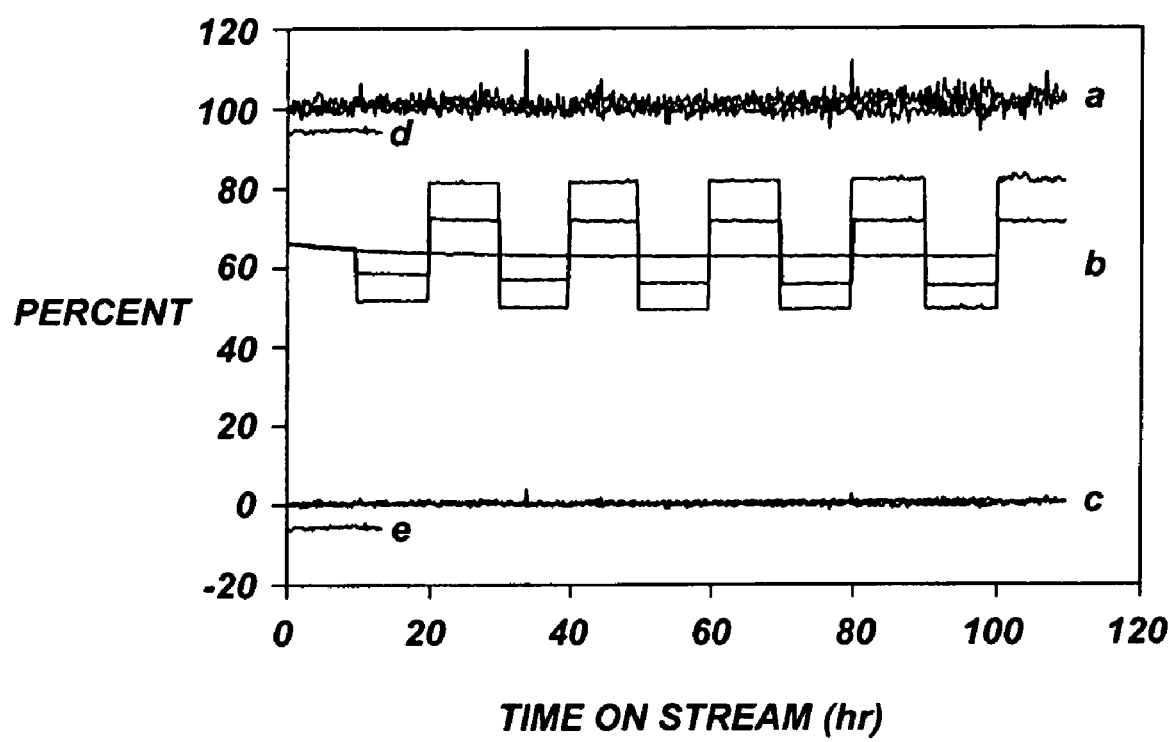
FIG. 22 shows (a) the carbon monoxide selectivity, (b) percent CO in the CO and $H_2$ product distribution, and (c) percent error in the carbon balance for various Ni—Sn/YSZ catalysts with a 40 mol % Sn in the Ni—Sn fraction, upon exposure to a $CH_4$/$CO_2$ stream, and (d) the carbon monoxide selectivity and (e) percent error in the carbon balance for a Ni/YSZ catalyst.

FIG. 22 shows the carbon monoxide selectivity, CO and $H_2$ product distribution of the reaction, and the carbon balance error as a percent (negative represents less carbon measured than fed as a percentage of the feed) for the catalyst runs of Examples 17, 18, and 19 on the same graph. Also included are the carbon loss and carbon monoxide selectivity from the catalyst run of Example 16. FIG. 22 shows (a) the carbon monoxide selectivity, (b) percent CO in the CO and $H_2$ product distribution, and (c) percent error in the carbon balance for various Ni—Sn/YSZ catalysts with a 40 mol % Sn in the Ni—Sn fraction, upon exposure to a $CH_4/CO_2$ stream, and (d) the carbon monoxide selectivity and (e) percent error in the carbon balance for a Ni/YSZ catalyst. Both catalyst systems employed a 60 vol % YSZ fraction. The methane to carbon dioxide ratio was variable for two of the Ni—Sn/YSZ runs, while held constant and set at 1 for the other Ni—Sn/YSZ and Ni/YSZ runs shown.

Example 20

Catalytic Conversion of Methane Over Doped Ceria

Figure 23:
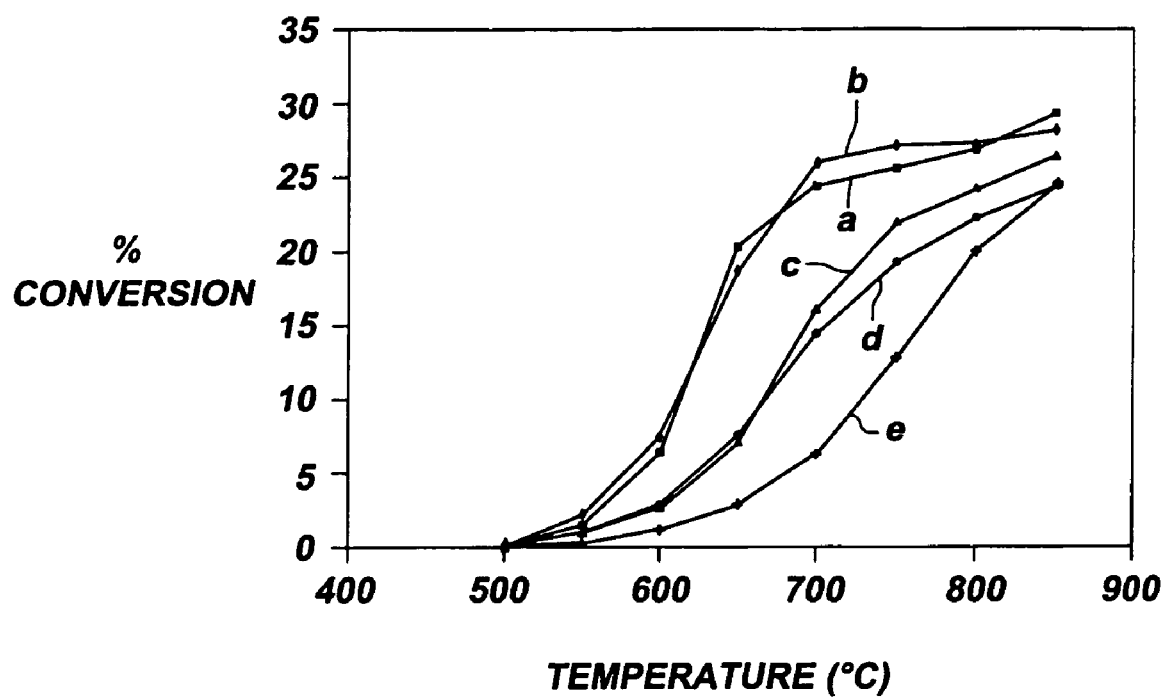
FIG. 23 shows a graph of methane conversion as a function of temperature over (a) undoped ceria and over ceria doped with (b) 20 mol % Y, (c) 20 mol % Zr, (d) 20 mol % Sc, and (e) 20 mol % Ca at 65,000 $hr^{-1}$ with a $CH_4$/$O_2$ molar ratio of 2.

In many anode systems, cerium is added to improve the anode performance. This is especially important for all-ceramic anode formulations such as the strategies of Example 2. As such, ceria oxide may be required to provide sufficient catalytic activity for methane conversion such that the power production may not be limited. To improve catalytic activity, ceria was first doped with 20 mol % Y, Zr, Sc or Ca (oxygen free basis) since the resulting doped ceria materials were known to be stable solid solutions up to 1200° C. The doped ceria materials (0.02 g) were examined for the oxidation of 3% $CH_4$ in 1.5% $O_2$ at 65,000 $h^{-1}$. Methane was combusted over all the doped ceria catalysts; only a small amount of hydrogen was generated at the higher temperatures. FIG. 23 shows a graph of methane conversion as a function of temperature over (a) undoped ceria and over ceria doped with (b) 20 mol % Y, (c) 20 mol % Zr, (d) 20 mol % Sc, and (e) 20 mol % Ca at 65,000 $hr^{-1}$ with a $CH_4/O_2$ molar ratio of 2. None of the non-lanthanide dopants studied were shown to enhance ceria's activity towards methane conversion.

Figure 24:
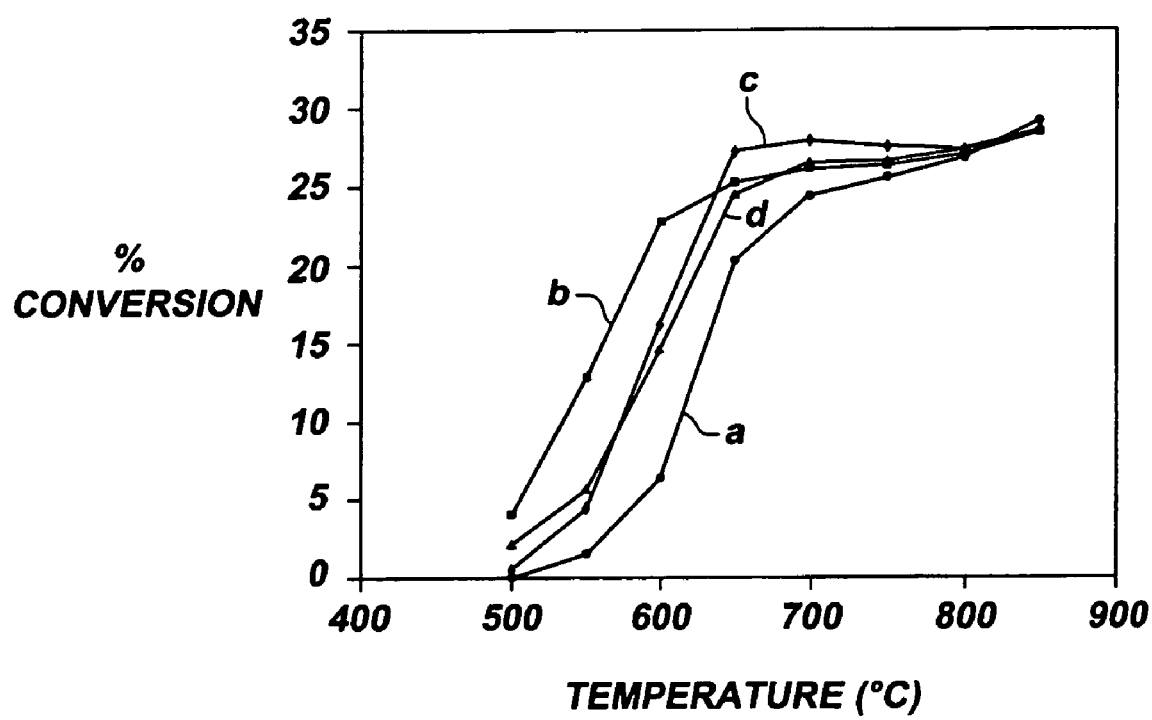
FIG. 24 shows a graph of methane conversion as a function of temperature over (a) undoped ceria and over ceria doped with (b) 20 mol % Pr, (c) 20 mol % Sm and (d) 20 mol % Tb at 65,000 $hr^{-1}$ with a $CH_4$/$O_2$ molar ratio of 2.

Ceria was then doped with lanthanides such as Pr and Tb, since praseodymia and terbia have the same crystal structure as ceria and form a single-phase fluorite structure with ceria. Sm was also examined as it has been the most common dopant for increasing ceria's ionic conductivity. FIG. 24 shows a graph of methane conversion as a function of temperature over (a) undoped ceria and over ceria doped with (b) 20 mol % Pr, (c) 20 mol % Sm and (d) 20 mol % Tb at 65,000 $hr^{-1}$ with a $CH_4/O_2$ molar ratio of 2. As shown in FIG. 24, the activity and stability of ceria were increased with Pr, Tb and Sm doping. These materials all catalyzed the combustion reaction, producing only a small amount of hydrogen at elevated temperatures. The low-temperature activity was correlated to the reducibility of the doped ceria. The lanthanide dopants lowered the temperature required for oxygen extraction from ceria, leading to improved methane oxidation.

Differential rates were obtained for the doped ceria materials at 750° C. by diluting the catalysts with alumina to obtain an effective space velocity of 1,500,000 $h^{-1}$. The rates were reproduced by varying the catalyst loading and adjusting the reactant flow rate while maintaining the same space velocity. This indicated that the homogeneous reactions were limited. The surface area normalized rates in Table 4 illustrated the effectiveness of lanthanide doping on ceria. To understand how these rates might affect the maximum power density obtained from the resulting SOFC system, the reaction rates were converted into current densities. The calculation was based on the oxygen flow required to maintain the methane reaction rate over a ceria laminate with the same surface area as the electrolyte. Three-dimensionally active electrodes would increase the active area available for reaction beyond this assumption. The calculated current densities were slightly higher than those experimentally obtained with methane over the Cu/ceria-based anodes. However, they were well below those obtained over the best hydrogen-fed SOFC systems. Besides doping, it might be important to include metal catalysts to achieve high power densities in the all-ceramic anodes.

TABLE 4

Rate of methane conversion at 750° C. and a $CH_4/O_2$ molar ratio of 2.

| Catalyst | Reaction Rate (mol/s/g) | Reaction Rate (mol/s/m²) | Equivalent Current Density (A/cm²) |
| --- | --- | --- | --- |
| Ceria | 0.30 | 0.0086 | 0.66 |
| Praseodymia | 0.46 | 0.022 | 1.7 |
| 20 at % Tb—$CeO_2$ | 0.51 | 0.014 | 1.1 |
| 20 at % Sm—$CeO_2$ | 0.57 | 0.015 | 1.2 |
| 20 at % Pr—$CeO_2$ | 0.72 | 0.014 | 1.1 |

To measure the conductivity of doped ceria, dense sample bars were compacted by cold isostatic pressing at 50,000 psi and sintered at 1400° C. Doped praseodymia samples were also included due to the high reaction rate of pure praseodymia (Table 4). However, the Pr-containing pellets underwent severe cracking upon cooling (Table 5). Firing in nitrogen helped alleviate the cracking problem, but the pellets degraded to a powder upon storage at room temperature. Pure, Tb-doped and Sm-doped ceria pellets were successfully densified.

TABLE 5

Effect of processing atmosphere on the mechanical stability of pure and doped ceria and praseodymia.

| Dopant | Ceria | | | | Praseodymia | | | |
| --- | --- | --- | --- | --- | --- | --- | --- | --- |
| | — | 20% Sm | 20% Tb | 20% Pr | — | 20% Sm | 20% Tb | 20% Ce |
| $O_2$-Fired | Dense | Dense | Dense | Cracked | Cracked | Cracked | Cracked | Cracked |
| $N_2$-Fired | Dense | Dense | Dense | Cracked | Dense | Dense | Dense | Cracked |
| % Porosity | 1.4 | 1.6 | 1.1 | N/A | N/A | N/A | N/A | N/A |

Figure 25:
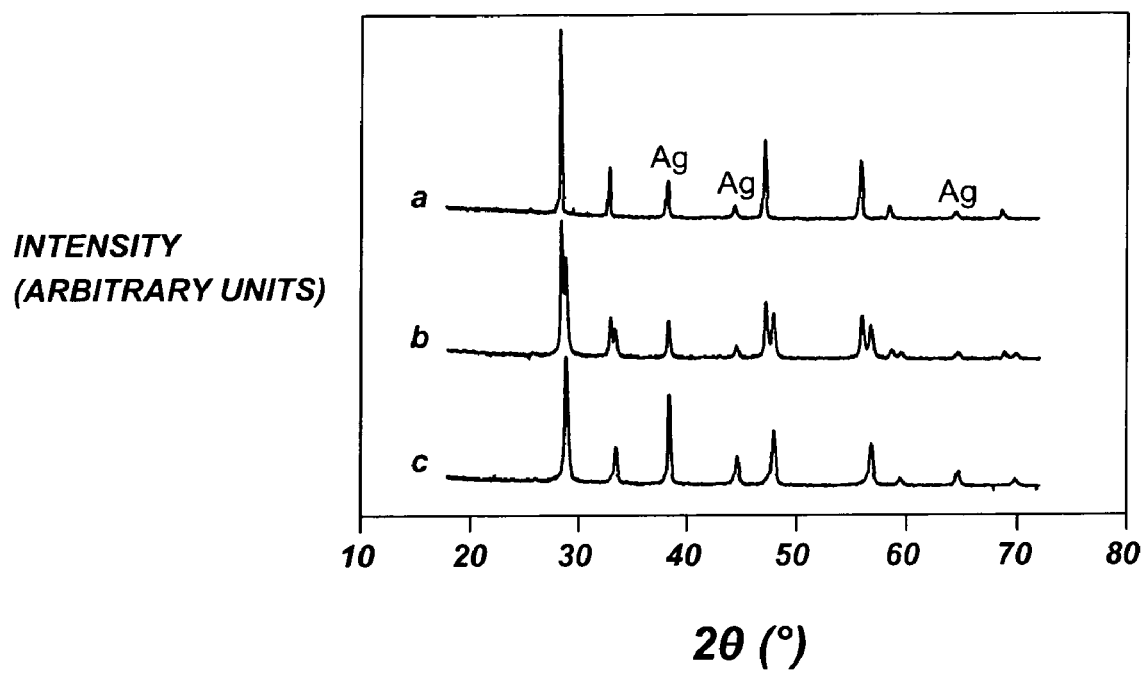
FIG. 25 shows XRD patterns of praseodymia (a) as-prepared (pure $PrO_2$ phase), (b) after firing at 800° C. in air (mixed $PrO_2$ and $Pr_6O_{11}$ phases), and (c) after sintering at 1400° C. in air (pure $Pr_6O_{11}$ phase). A silver internal standard was used.

XRD was used to investigate the phase changes in praseodymia during thermal treatment. FIG. 25 shows XRD patterns of praseodymia (a) as-prepared (pure $PrO_2$ phase), (b) after firing at 800° C. in air (mixed $PrO_2$ and $Pr_6O_{11}$ phases), and (c) after sintering at 1400° C. in air (pure $Pr_6O_{11}$ phase). A silver internal standard was used. The XRD patterns show that praseodymia may be prepared in a pure $PrO_2$ phase and a mixed $PrO_2/Pr_6O_{11}$ phase by firing at 800° C. in pure oxygen and air, respectively. Sintering at 1400° C. in air resulted in a pure $Pr_6O_{11}$ phase, with a lattice volume increase of 4%. This lattice expansion might have caused the cracking of Pr-containing pellets.

Example 21

Co-Precipitation of $CeO_2/LaCrO_3$ Nanocomposites

Lanthanum chromate was mixed with ceria to provide the electrical conduit in the resulting ceramic composite anode.

Figure 3:
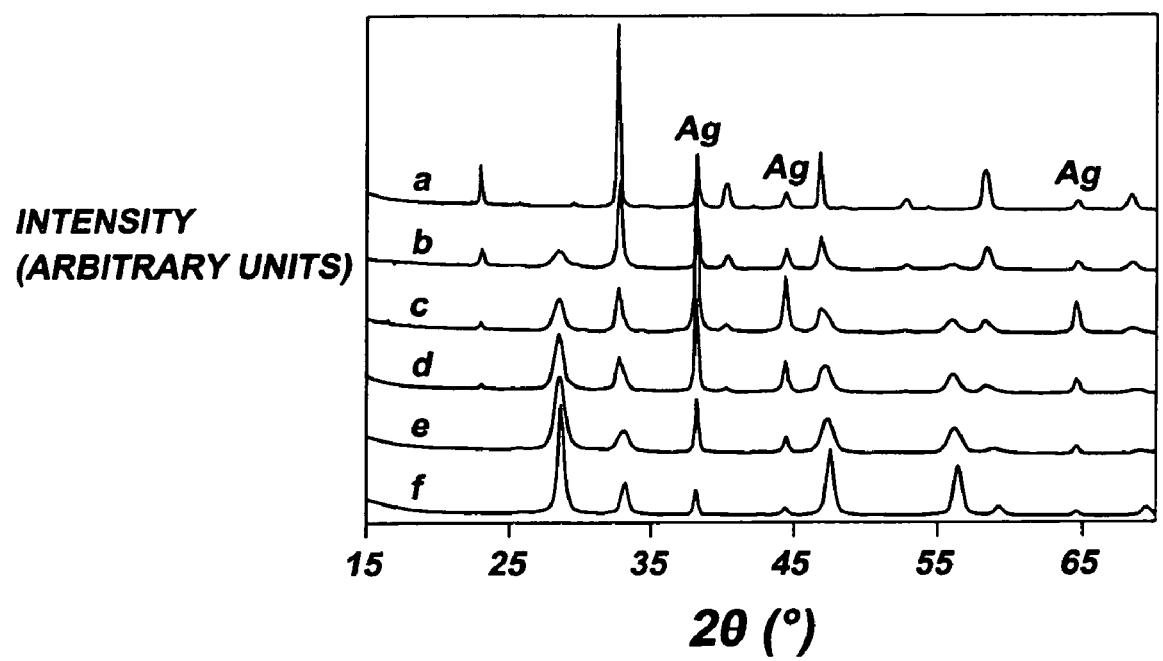
FIG. 3 shows X-ray diffraction (XRD) patterns of $CeO_2$/$LaCrO_3$ composites with (a) 100 vol %, (b) 80 vol %, (c) 60 vol %, (d) 40 vol %, (e) 20 vol % and (f) 0 vol % $LaCrO_3$, calcined at 800° C. A silver internal standard was used.
Figure 26:
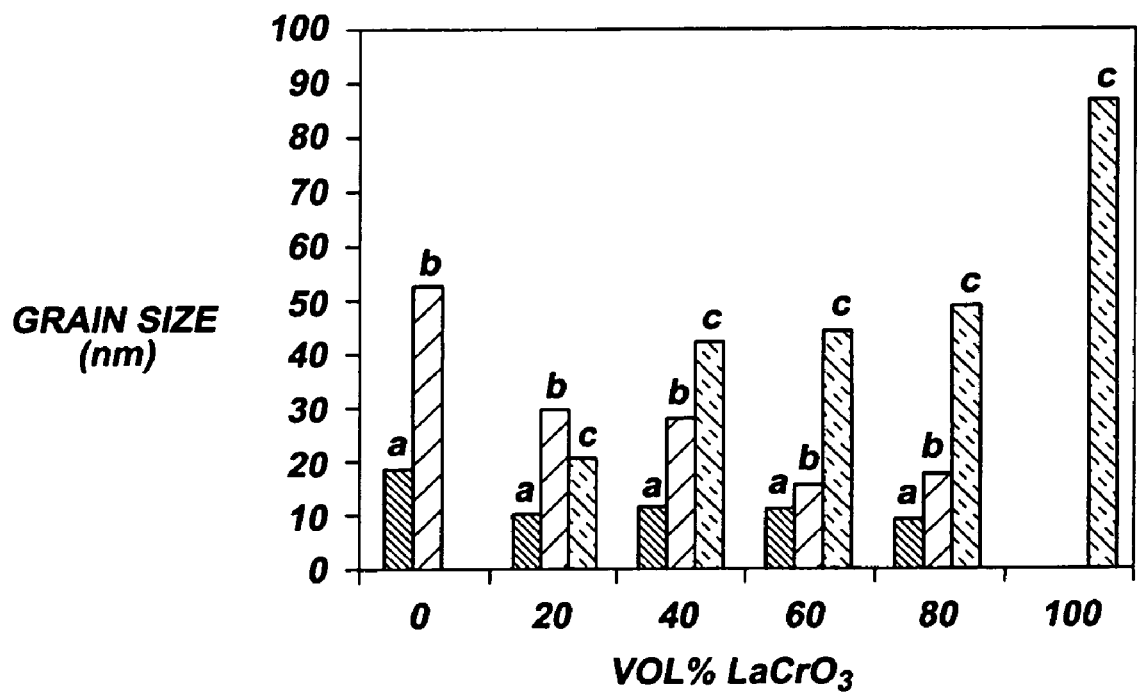
FIG. 26 shows a graph of (a) the grains sizes of $CeO_2$ in $CeO_2/LaCrO_3$ nanocomposites calcined at 800° C. in air, and (b) $CeO_2$ and (c) $LaCrO_3$ in $CeO_2/LaCrO_3$ nanocomposites reduced at 800° C. in hydrogen.

To achieve a highly dispersed composite, chemical co-precipitation was employed instead of physical mixing of different oxide powders. FIG. 3 shows the XRD patterns of 800° C.-calcined $CeO_2/LaCrO_3$ composites with (a) 100, (b) 80, (c) 60, (d) 40, (e) 20 and (f) 0 vol % $LaCrO_3$, using a silver internal standard. The ceria and lanthanum chromate phases were successfully achieved by co-precipitation for the various $CeO_2/LaCrO_3$ composites. The grain size of the ceria and lanthanum chromate phases was analyzed after calcination at 800° C. in air and in hydrogen. FIG. 26 shows a graph of (a) the grains sizes of $CeO_2$ in $CeO_2/LaCrO_3$ nanocomposites calcined at 800° C. in air, and (b) $CeO_2$ and (c) $LaCrO_3$ in $CeO_2/LaCrO_3$ nanocomposites reduced at 800° C. in hydrogen. Finer $CeO_2$ and $LaCrO_3$ grains were obtained in the nanocomposites than in the respective pure oxides, indicating the successful suppression of grain growth in the presence of a secondary phase. The $CeO_2/LaCrO_3$ nanocomposites also demonstrated increased ceria stability towards reduction. For pure ceria, the grain size nearly tripled when exposed to dry 7% hydrogen at 800° C. for 3 h. In the $CeO_2/LaCrO_3$ nanocomposite with 60 vol % $LaCrO_3$, ceria's grain growth was limited to ~35%.

Figure 27:
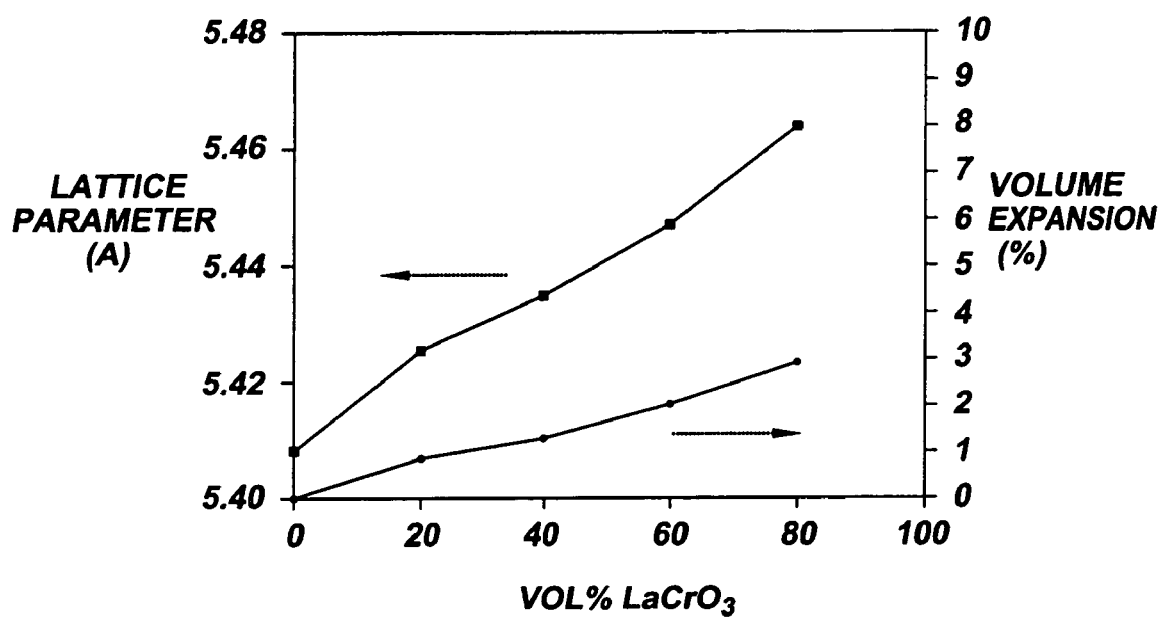
FIG. 27 shows a graph of (a) the cubic lattice parameter and (b) the volume expansion in ceria for $CeO_2/LaCrO_3$ composites sintered at 1400° C.

Silver was added as an internal standard to allow for peak shift analysis of ceria (111) ($2\theta \sim 28°$) in the XRD patterns of $CeO_2/LaCrO_3$ composites. $La^{+3}$ doping would expand ceria's fluorite lattice since it has a larger ionic radii (1.18 Å) than $Ce^{+4}$ (0.97 Å). FIG. 27 shows a graph of (a) the cubic lattice parameter and (b) the volume expansion in ceria for $CeO_2/LaCrO_3$ composites sintered at 1400° C. As shown in FIG. 27, ceria's lattice parameter increased linearly with $LaCrO_3$ loading in the 1400° C.-sintered $CeO_2/LaCrO_3$ composites. This indicated an increased La doping in ceria with increasing $LaCrO_3$ loading in the composite, which would in turn correspond to an A-site deficiency in the $LaCrO_3$ perovskite. La-doped ceria might provide for increased catalytic activity for methane conversion.

Example 22

Synthesis of Doped Ceria Dispersions

As the alternative lanthanide dopants for ceria could also be doped into the perovskite structure, it would be important that doped ceria and lanthanum chromate be prepared separately. This could be achieved by synthesizing two separate hydroxide slurries, and combining them right before the drying and agglomeration steps. Mixing the materials in the form of well-dispersed hydroxide slurries would provide a more intimate mixture than the physical mixing of calcined oxide powders.

Ce(IV) oxide sols have been prepared by the peptization of hydroxide precipitates in hot nitric acid. However, lanthanide (III) dopants such as Sm would leach out from the sol during peptization. Furthermore, addition of an acidic sol to the basic hydroxide precursor of lanthanum chromate would result in dissolution.

In this case, the isoelectric point of the precursor would be crossed by rinsing in methanol even though the precipitation was performed in excess base. To prepare Sm-doped cerium hydroxide, an aqueous solution of Ce(III) and Sm(III) nitrates (0.8 M) was added to a 0.4 M solution of TEAH in isopropanol. The base excess used was 1.5 based on the Ce(III) ion. Upon rinsing in methanol, a suspension of 100-nm particles was obtained.

Figure 28A:
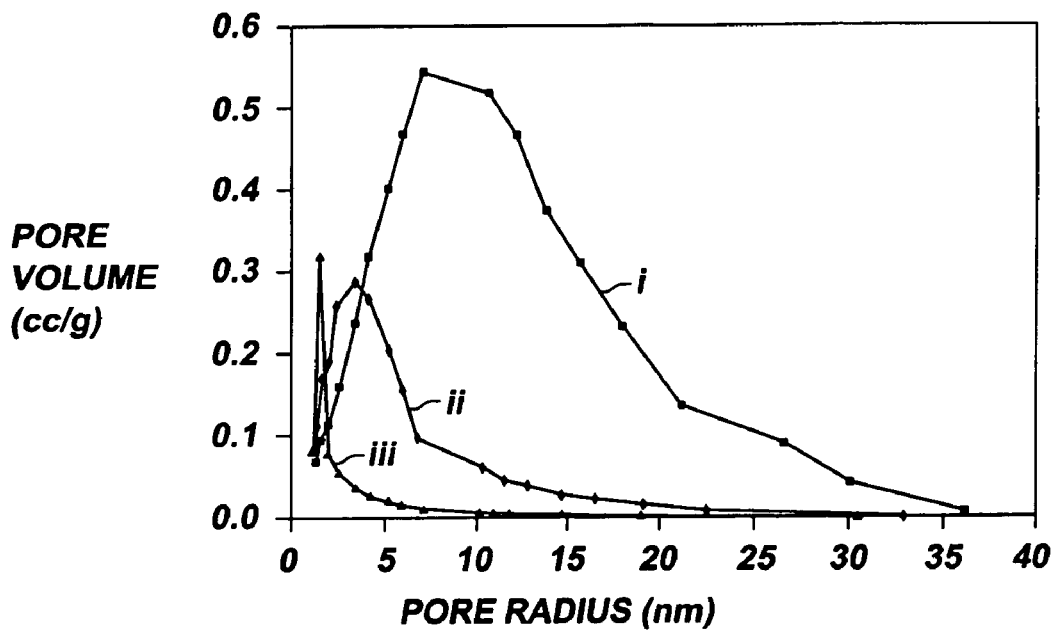
FIG. 28A shows a graph of pore size distributions of Sm-doped ceria particles calcined at 400° C. that have been subjected to (i) isopropanol cake (IC), (ii) methanol cake (MC) and (iii) methanol homogenized slurry (MH) treatments.
Figure 28B:
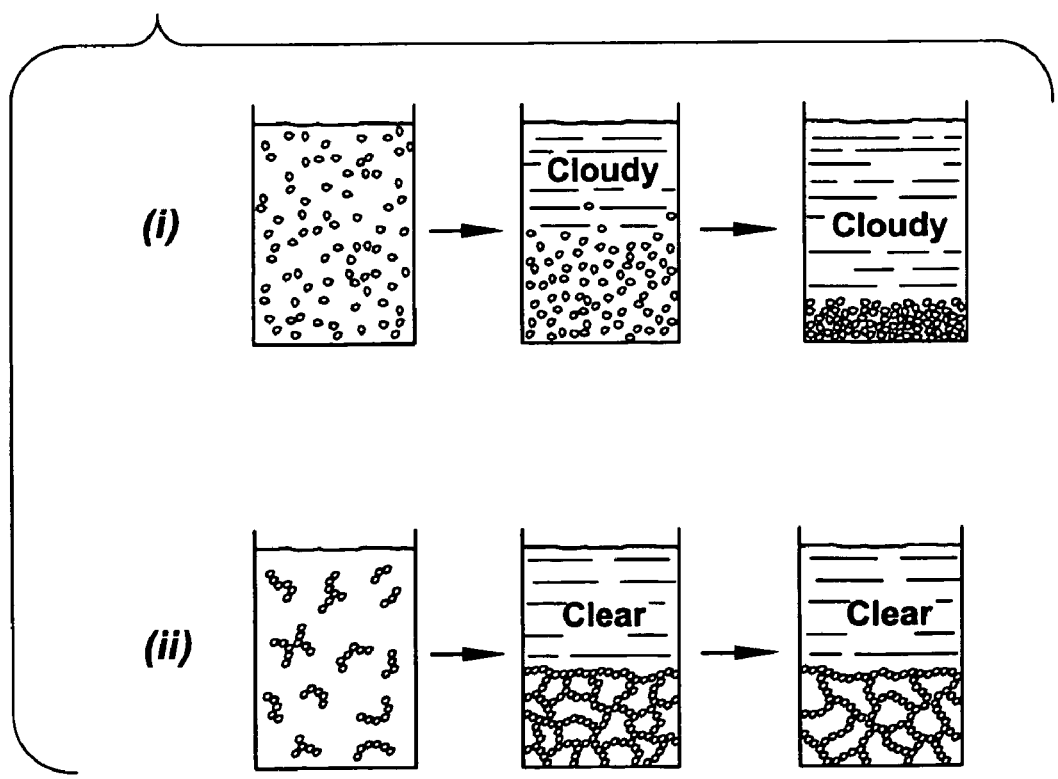
FIG. 28B shows an illustration of oxide sedimentation from (i) a dispersed state and (ii) a flocculated state.

The powders obtained by this synthesis were quite different from the conventional powders. To illustrate the effect of dispersion on textural properties, a large quantity of Sm-doped cerium hydroxide was prepared and subjected to four different treatments. In all four cases, the precipitate was initially collected by centrifugation. It was then rinsed three times in methanol (M) or isopropanol (I) using a homogenizer. Unlike the isopropanol rinses, methanol rinses resulted in a suspension that became difficult to centrifuge. After rinsing, the powders were collected by room-temperature drying of the centrifuge cake (C) or the homogenized slurry (H). The properties of samples of a centrifuge cake rinsed with isopropanol (IC) and a homogenized slurry rinsed with isopropanol (IH) were essentially identical since a stable dispersion was not produced from isopropanol rinses. Samples of a centrifuge cake rinsed with methanol (MC) and a homogenized slurry rinsed with methanol (MH) have slightly different properties. As seen in FIG. 28, the properties of the MC and MH samples were very different from the IC and IH samples. FIG. 28A shows a graph of pore size distributions of Sm-doped ceria particles calcined at 400° C. that have been subjected to (i) IC, (ii) MC and (iii) MH treatments. FIG. 28B shows an illustration of oxide sedimentation from (i) a dispersed state and (ii) a flocculated state.

The dispersed hydroxides (obtained from methanol rinses) produced powders (MC and MH) that could be more tightly packed than the flocculated systems (obtained from isopropanol rinses). The dispersed hydroxide that was dried slowly in the form of a homogenized slurry (MH) gave rise to the smallest pore radius. The differences in the pore size distributions of these doped ceria particles led to large differences in the microscopic and macroscopic properties.

Figure 29A:
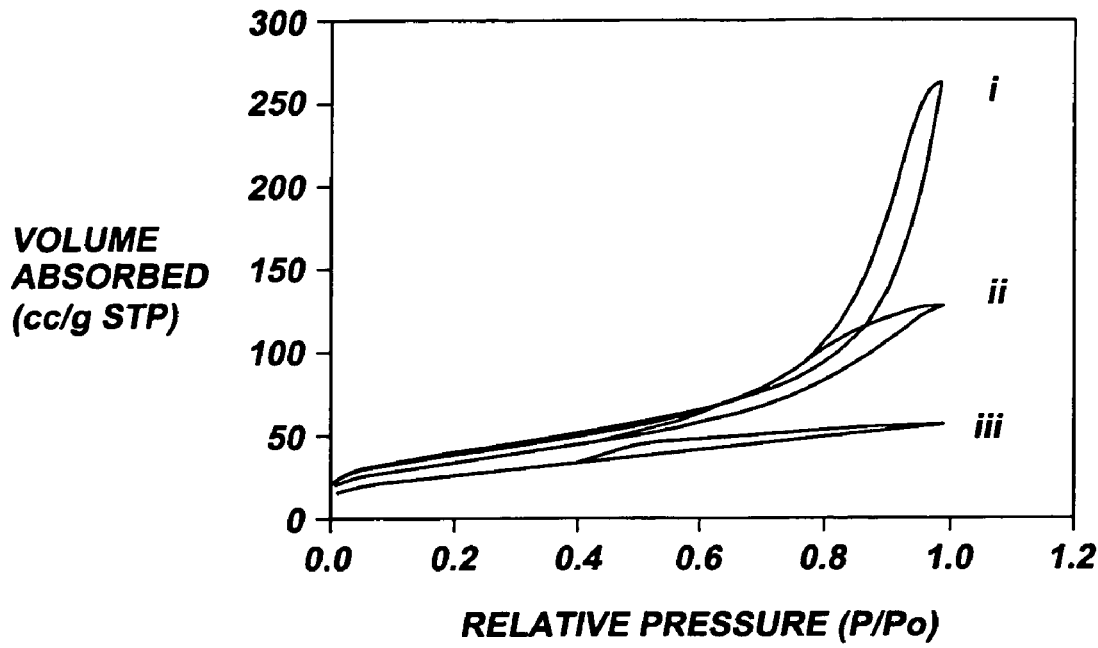
FIG. 29A shows the nitrogen adsorption-desorption isotherms of 400° C.-calcined Sm-doped ceria particles subjected to (i) IC, (ii) MC and (iii) MH treatments.
Figure 29B:
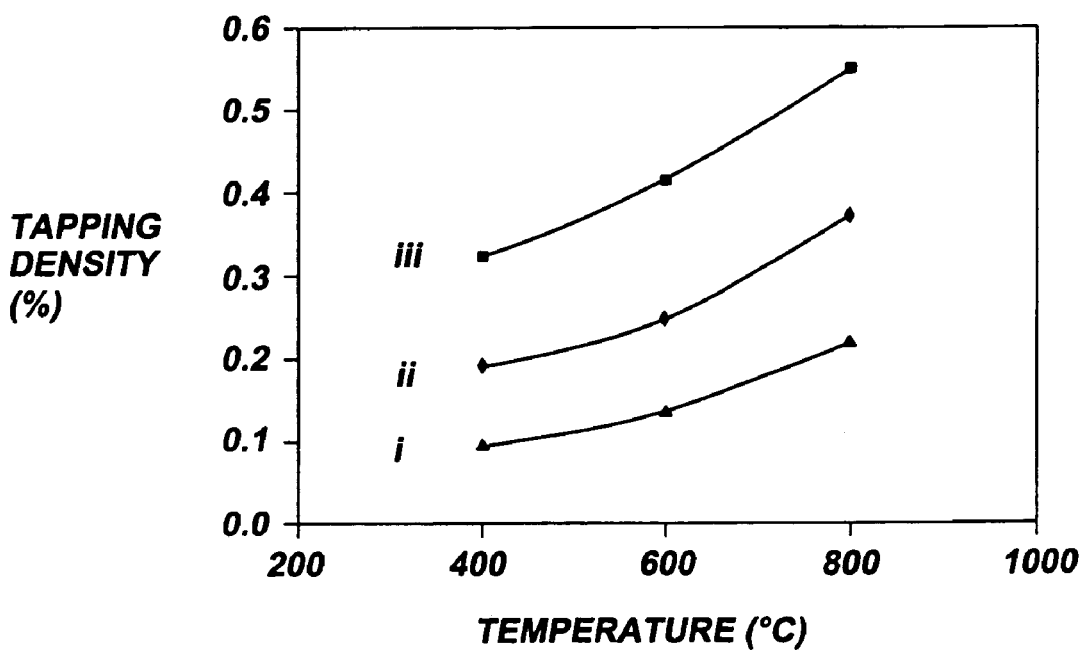
FIG. 29B shows tapping densities of Sm-doped ceria particles calcined at 400° C., 600° C., and 800° C. that have been subjected to (i) IC, (ii) MC and (iii) MH treatments.

The flocculated sample (IC) at 400° C. has a high surface area of 143 $m^2/g$ and a high pore volume of 0.411 cc/g. The well-dispersed sample (MH) also has a high surface area (94 $m^2/g$), but a low pore volume (0.08 cc/g). The MC sample has an intermediate surface area of 123 $m^2/g$ and an intermediate pore volume of 0.19 cc/g. The pore volume also affected the tapping density of the collected powders. FIG. 29A shows the nitrogen adsorption-desorption isotherms of 400° C.-calcined Sm-doped ceria particles subjected to (i) IC, (ii) MC and (iii) MH treatments. FIG. 29B shows tapping densities of Sm-doped ceria particles calcined at 400° C., 600° C., and 800° C. that have been subjected to (i) IC, (ii) MC and (iii) MH treatments.

The MH particles have a tapping density of 33% at 400° C., whereas the ceramic processing grade Sm-doped ceria (Nex-Tech) only has a tapping density of 15% and a surface area of 14 $m^2/g$. At 800° C., the MH sample lost almost all of its surface area since its small pores could be easily removed during sintering. Overall, the well-dispersed Sm-doped ceria system (MH) has similar textural properties as pure ceria derived by conventional sol processing. The new approach would be very useful since it could be easily applied to the synthesis of multicomponent oxides, without the limitations of conventional sol processing.

Example 23

Application of $CeO_2/LaCrO_3$ Composites to Anode-supported SOFC

As described herein, initial efforts were focused on conductive ceramics that may be more robust in oxidation cycling than metallic systems.

$CeO_2/LaCrO_3$ composites were prepared according to Example 21. Although the individual phases could successfully be formed through this coprecipitation technique, the intimate mixture of $LaCrO_3$ and cerium oxide led to chromium (IV) formation, which is toxic. Ce(IV) is strong oxidizer, and Cr(III) oxidation was pervasive even when a physical mixture of $CeO_2$ and $LaCrO_3$ powders was used.

What is claimed:

1. A method comprising:
   contacting a reactant gas comprising a hydrocarbon in a coking environment with a catalytic material comprising an intermetallic compound that is present in the catalytic material in 0.5-40 volume % of the catalytic material, the intermetallic compound comprising a transition metal and a metal additive selected from among at least one of Sn, Ge, In, Tl, Ga, Pb, As, Sb and Bi, or any combination of one or more of these, wherein the additive is present in an amount less than 50 mol % of the intermetallic compound and the intermetallic compound is characterized by a crystalline structure different from crystalline structures of the transition metal and the metal additive, and wherein the contacting takes place at 600° C. or higher; and
   dry reforming the hydrocarbon gas in the coking environment to produce a desired product.

2. The method of claim 1, wherein the transition metal is nickel.

3. The method of claim 1, wherein the transition metal is iron or cobalt.

4. The method of claim 1, wherein the additive is tin.

5. The method of claim 1, wherein the catalytic material further comprises a ceramic phase.

6. The method of claim 5, wherein the ceramic phase comprises an ionic conductor.

7. The method of claim 6, wherein the ionic conductor comprises yttria-stabilized zirconia.

8. The method of claim 1, wherein the catalytic material further comprises a refractory additive.

9. The method of claim 8, wherein the refractory additive is alumina.

10. The method of claim 1, wherein the intermetallic compound is present in the catalytic material in 10-15 volume % of the catalytic material.

11. The method of claim 1, wherein the additive is present in the intermetallic compound in an amount less than 40 mol % of the intermetallic compound.

12. The method of claim 1, wherein the additive is present in the intermetallic compound in an amount between 30 mol % and 40 mol % of the intermetallic compound.

13. The method of claim 1, wherein the intermetallic compound further comprises a refractory additive.

14. The method of claim 1, wherein the melting point of the intermetallic compound is greater than 600° C.

15. The method of claim 1, wherein the melting point of the intermetallic compound is greater than 700° C.

16. The method of claim 1, wherein the melting point of the intermetallic compound is greater than 800° C.

17. The method of claim 1, wherein the melting point of the intermetallic compound is greater than 850° C.

18. The method of claim 1, wherein the melting point of the intermetallic compound is greater than 900° C.

19. The method of claim 1, wherein the melting point of the intermetallic compound is greater than 1000° C.

20. The method of claim 1, wherein the reactant gas is a fuel supply.

21. The method of claim 20, wherein the fuel supply comprises a hydrocarbon and carbon dioxide.

22. The method of claim 20, wherein the fuel supply comprises methane and carbon dioxide.

23. The method of claim 20, wherein the fuel supply comprises methane, carbon dioxide, and steam.

24. The method of claim 20, wherein the fuel supply comprises sulfur.

25. The method of claim 1, wherein the additive is present in the intermetallic compound in an amount between 25 mol % and 50 mol % of the intermetallic compound.

26. The method of claim 1, wherein the additive is present in the intermetallic compound in an amount between 25 mol % and 40 mol % of the intermetallic compound.

27. The method of claim 1, wherein the intermetallic compound is $Ni_3Sn$.

28. The method of claim 1, wherein the intermetallic compound is $Ni_3Sn_2$.

29. The method of claim 1, wherein the catalytic material comprises $NiSb$—$Ni_3Sn_2$.

* * * * *